(12) United States Patent
Pian et al.

(10) Patent No.: US 12,457,376 B2
(45) Date of Patent: Oct. 28, 2025

(54) DISPLAY METHOD AND DISPLAY DEVICE

(71) Applicant: HISENSE VISUAL TECHNOLOGY CO., LTD., Shandong (CN)

(72) Inventors: Zhaofeng Pian, Shandong (CN); Rongbo Zhang, Shandong (CN); Jinliang Hou, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 120 days.

(21) Appl. No.: 18/477,204

(22) Filed: Sep. 28, 2023

(65) Prior Publication Data

US 2024/0022780 A1    Jan. 18, 2024

Related U.S. Application Data

(63) Continuation of application No. PCT/CN2022/082624, filed on Mar. 24, 2022.

(30) Foreign Application Priority Data

| Apr. 6, 2021 | (CN) | .......................... 202110367979.6 |
| Apr. 6, 2021 | (CN) | .......................... 202110368899.2 |
| Apr. 16, 2021 | (CN) | .......................... 202110413374.6 |

(51) Int. Cl.
*H04N 21/422* (2011.01)
*H04N 21/462* (2011.01)

(52) U.S. Cl.
CPC ..... *H04N 21/4221* (2013.01); *H04N 21/4622* (2013.01)

(58) Field of Classification Search
CPC ........... H04N 21/4221; H04N 21/4622; H04N 21/4432; G06F 9/451
See application file for complete search history.

(56) References Cited

U.S. PATENT DOCUMENTS 8,918,411 B1 * 12/2014 Latif .................. G06F 16/9535
707/790
11,054,977 B2 * 7/2021 Sun ........................ G06F 3/0483
(Continued)

FOREIGN PATENT DOCUMENTS

| CN | 1501240 A | 6/2004 |
| CN | 102938862 A | 2/2013 |

(Continued)

OTHER PUBLICATIONS

International Search Report, mailed May 31, 2022, from PCT/CN2022/082624, 6 pages.

(Continued)

*Primary Examiner* — Faisal M Zaman
(74) *Attorney, Agent, or Firm* — Workman Nydegger

(57) ABSTRACT

Disclosed is a display apparatus and method. The method includes: in response to a boot command for starting the display apparatus from a user, entering a preset application in the display apparatus, where a user interface of the preset application is a black screen; in response to the smart boot mode being in the on state, reading an attribute value stored in a database of the display apparatus; if the attribute value is a first preset value, controlling the display to present a startup homepage, and exiting from the preset application; and if the attribute value is a second preset value, reading an input ID, controlling the display to present an interface of a physical source corresponding to the input ID, and exiting from the preset application.

18 Claims, 19 Drawing Sheets

(56) References Cited

U.S. PATENT DOCUMENTS

| | | | |
|---|---|---|---|
| 2004/0130580 A1 | 7/2004 | Howard et al. | |
| 2006/0005222 A1* | 1/2006 | Sato | H04N 21/440272 348/E5.002 |
| 2006/0215062 A1* | 9/2006 | Hirayama | H04N 21/4854 348/E5.103 |
| 2006/0282658 A1 | 12/2006 | Tang | |
| 2010/0070927 A1* | 3/2010 | Akiya | G06F 16/50 715/838 |
| 2012/0169931 A1* | 7/2012 | Mohapatra | H04N 21/42692 348/563 |
| 2015/0121303 A1* | 4/2015 | Zhu | G06F 9/451 715/800 |
| 2017/0064396 A1* | 3/2017 | Yun | H04N 21/4826 |
| 2021/0243401 A1* | 8/2021 | Richman | H04N 21/4316 |
| 2022/0191576 A1* | 6/2022 | Wu | G10L 15/02 |
| 2024/0019993 A1* | 1/2024 | Rosenstein | G06F 9/451 |
| 2025/0008007 A1* | 1/2025 | Zhang | G06F 1/1652 |

FOREIGN PATENT DOCUMENTS

| | | |
|---|---|---|
| CN | 103037264 A | 4/2013 |
| CN | 103108225 A | 5/2013 |
| CN | 103916703 A | 7/2014 |
| CN | 104994427 A | 10/2015 |
| CN | 105159721 A | 12/2015 |
| CN | 105245954 A | 1/2016 |
| CN | 105307049 A | 2/2016 |
| CN | 105323643 A | 2/2016 |
| CN | 105376650 A | 3/2016 |
| CN | 105554536 A | 5/2016 |
| CN | 105573748 A | 5/2016 |
| CN | 105578306 A | 5/2016 |
| CN | 107071571 A | 8/2017 |
| CN | 111246309 A | 6/2020 |
| CN | 111432256 A | 7/2020 |
| CN | 111679869 A | 9/2020 |
| CN | 112040308 A | 12/2020 |
| CN | 112135180 A | 12/2020 |
| CN | 112188279 A | 1/2021 |
| CN | 112492366 A | 3/2021 |
| CN | 113064534 A | 7/2021 |
| CN | 113064691 A | 7/2021 |
| WO | 2015074608 A1 | 5/2015 |

OTHER PUBLICATIONS

Chinese First Office Action, mailed Dec. 29, 2021, from Chinese App. No. 202110368899.2, 14 pages.

Chinese Second Office Action, mailed May 18, 2022, from Chinese App. No. 202110368899.2, 11 pages.

Chinese First Office Action, mailed Jan. 4, 2022, from Chinese App. No. 202110367979.6, 15 pages.

Chinese Second Office Action, mailed Aug. 3, 2022, from Chinese App. No. 202110367979.6, 10 pages.

Chinese First Office Action, mailed May 31, 2022, from Chinese App. No. 202110413374.6, 21 pages.

Chinese Second Office Action, mailed Dec. 1, 2022, from Chinese App. No. 202110413374.6, 21 pages.

* cited by examiner

DISPLAY METHOD AND DISPLAY DEVICE

CROSS REFERENCE TO RELATED APPLICATIONS

The application is a continuation application of International Application No. PCT/CN2022/082624 filed Mar. 24, 2022, which claims priority to the Chinese patent application No. 202110368899.2 filed on Apr. 6, 2021, the Chinese patent application No. 202110367979.6 filed on Apr. 6, 2021, and the Chinese patent application 202110413374.6 filed on Apr. 16, 2021, the entire contents of which are incorporated herein by references.

FIELD

The disclosure relates to a display technology, in particular to a display method and a display apparatus.

BACKGROUND

In the related art, when the display apparatus is powered on, by default it enters a homepage of launcher (for example, a desktop for Android system) or an interface for a signal source that was connected previously, or it enters an application when it is woken up by pressing a key corresponding to the application on a remote control.

SUMMARY

In a first aspect, embodiments of the disclosure provide a display apparatus, including a display configured to display an image from broadcast system or Internet, and/or, a user interface, a memory configured to store instructions and data associated with the display, a control device including at least one key and at least one processor in connection with the display and the memory. The at least one processor is configured to execute the instructions to cause the display apparatus to: in response to a boot command for starting the display apparatus from a user, enter a preset application in the display apparatus, where a user interface of the preset application is a black screen; detect whether a smart boot mode configured in the display apparatus is in an on state; in response to the smart boot mode being in the on state, read an attribute value stored in a database of the display apparatus, where the attribute value is set via a setting menu or a physical signal source setting menu; in response to the attribute value being a second preset value different from the first preset value, read an input ID configured in the display apparatus, control the display to present an interface of a physical signal source corresponding to the input ID, and exit from the preset application.

In a second aspect, a display method is provided. The method includes: in response to a boot command for starting the display apparatus from a user, entering a preset application in the display apparatus, where a user interface of the preset application is a black screen; detecting whether a smart boot mode configured in the display apparatus is in an on state; in response to the smart boot mode being in the on state, reading an attribute value stored in a database of the display apparatus, where the attribute value is set via a setting menu or a physical signal source setting menu; in response to the attribute value being a first preset value, causing the display to present a startup homepage, and exiting from the preset application; and in response to the attribute value being a second preset value different from the first preset value, reading an input ID configured in the display apparatus, controlling the display to present an interface of a physical signal source corresponding to the input ID, and exiting from the preset application.

DETAILED DESCRIPTION OF THE EMBODIMENTS

In order to make the purposes and embodiments of the disclosure clearer, the exemplary embodiments of the disclosure will be described clearly and completely below in combination with the accompanying drawings in the exemplary embodiments of the disclosure. Obviously, the described exemplary embodiments are some of the embodiments but not all the embodiments of the disclosure.

It should be noted that the brief description of the terms in the disclosure is only for the convenience of understanding the embodiments described hereafter, and is not intended to limit the embodiments of the disclosure. Unless indicated otherwise, these terms should be understood according to the plain and ordinary meanings.

Figure 1:
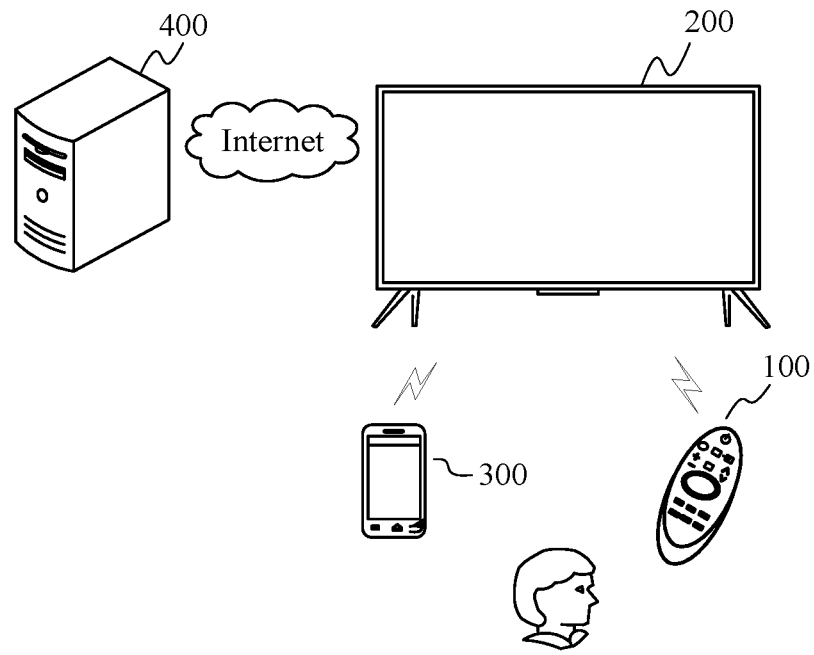
FIG. 1 shows a scenario of a display apparatus according to some embodiments.

FIG. 1 shows a schematic diagram of a scenario of a display apparatus according to an embodiment. As shown in FIG. 1, the display apparatus 200 communicates data with a server 400, and a user may operate the display apparatus 200 through a smart device 300 or a control device 100.

In some embodiments, the command for controlling the display apparatus may not be received via the above-mentioned smart terminal or control device, but based on user' touch or gesture.

In some embodiments, the control device 100 may be a remote control, and can communicate with the display apparatus 200 through at least one of infrared protocol communication or Bluetooth protocol communication and other short-range communication methods, and controls the display apparatus 200 wirelessly or by other wired methods.

In some embodiments, the smart device 300 may include any one of a mobile terminal, a tablet computer, a computer, a laptop computer, an AR/VR device, etc.

In some embodiments, the smart device 300 may also be used to control the display apparatus 200. For example, an application running on the smart device is used to control the display apparatus 200.

In some embodiments, the smart device 300 may communicate data with the display apparatus.

In some embodiments, the display apparatus 200 may also be controlled in a manner other than the control device 100 and the smart terminal 300. For example, the user's voice command may be directly received by a module for acquiring voice commands configured inside the display apparatus 200, or the user's voice command may be received by a voice control device provided outside the display apparatus 200.

In some embodiments, the display apparatus 200 also communicates data with the server 400. The display apparatus 200 may be allowed to perform the communication and connection through a Local Area Network (LAN), a Wireless Local Area Network (WLAN), and other networks. The server 400 may provide various contents and interactions to the display apparatus 200. The server 400 may be one or more clusters, and may include one or more types of servers.

Figure 2:
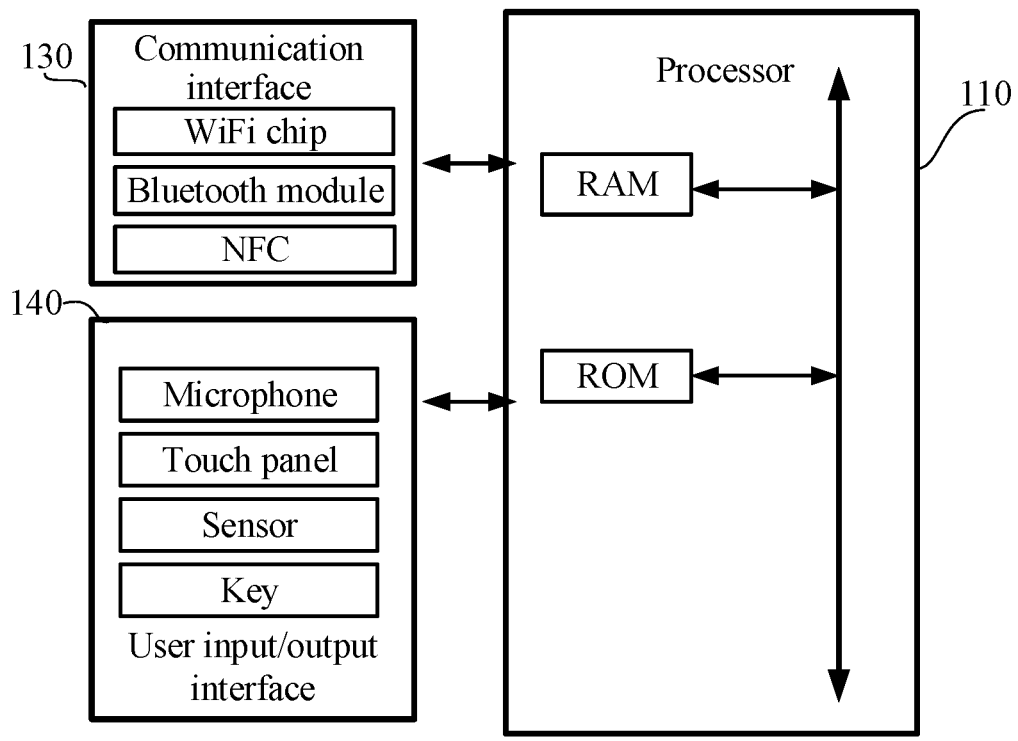
FIG. 2 shows a block diagram of hardware configuration of a control device 100 according to some embodiments.

FIG. 2 shows a block diagram of configuration of a control device 100 according to exemplary embodiments. As shown in FIG. 2, the control device 100 includes a processor 110, a communication interface 130, a user input/output interface 140, a memory and a power source. The control device 100 may receive a command from a user, converts the command to an instruction which can be recognized and responded by the display apparatus 200 and serves as an interactive medium between the user and the display apparatus 200.

In some embodiments, the communication interface 130 is configured to communicate with external devices, including at least one of a WIFI chip, a Bluetooth module, an NFC or alternative module.

In some embodiments, the user input/output interface 140 includes at least one of microphone, trackpad, sensor, key or alternative module.

Figure 3:
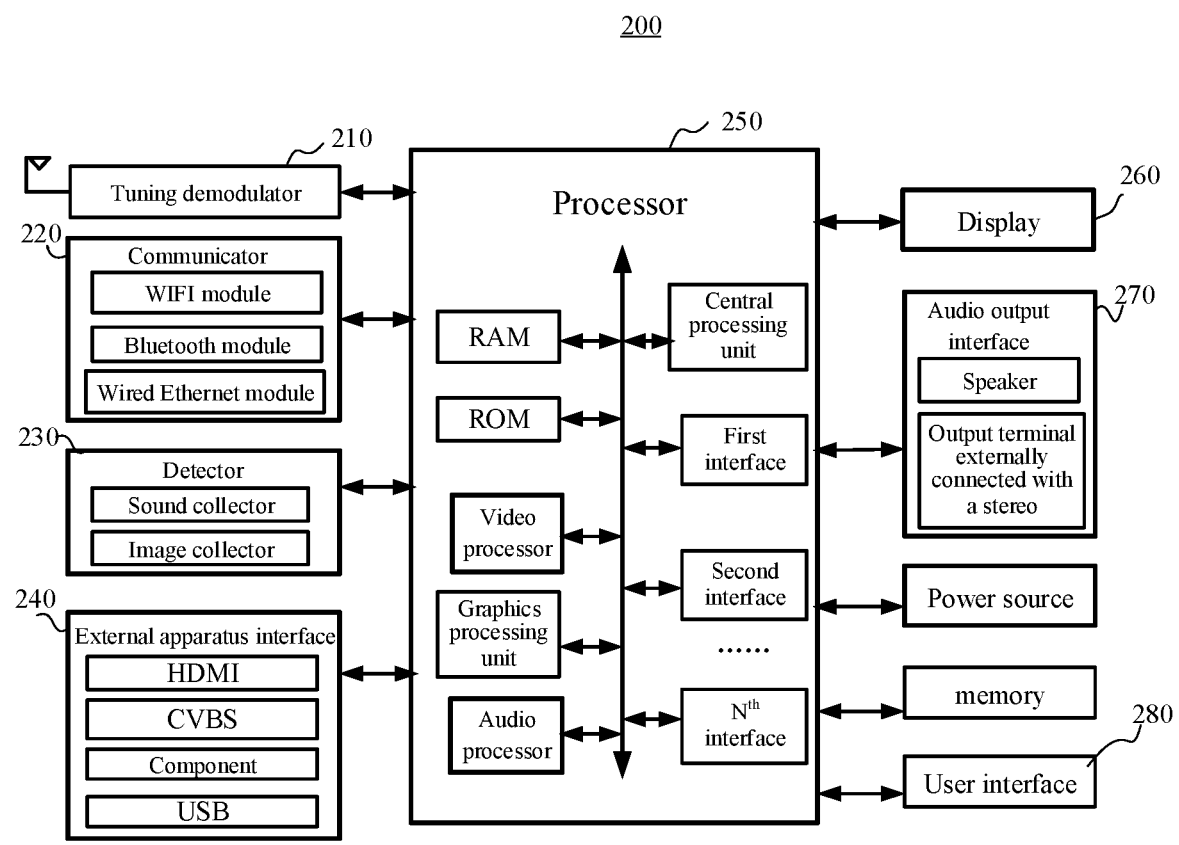
FIG. 3 shows a block diagram of hardware configuration of a display apparatus 200 according to some embodiments.

FIG. 3 shows a block diagram of a hardware configuration of the display apparatus 200 according to some embodiments.

In some embodiments, the display apparatus 200 includes at least one of a modem 210, a communicator 220, a detector 230, an external device interface 240, at least one processor 250, a display 260, an audio output interface 270, a memory, a power supply, a user interface.

In some embodiments, the at least one processor includes a central processing unit, a video processor, an audio processor, a graphics processing unit, an RAM, an ROM, and first to $n^{th}$ interfaces for input/output.

In some embodiments, the display 260 includes: a panel component for presenting an image, a driver component for driving the image display, a component for receiving an image signal output from the processor to display the video content and image content as well as a menu control interface, and a UI interface for user's operations, etc.

In some embodiments, the display 260 may be at least one of a liquid crystal display, an OLED display and a projection display, and may also be a projection device and a projection screen.

In some embodiments, the modem 210 receives signals from broadcast systems in a wired or wireless method, and demodulates audio and video signals, such as EPG data signals, from a plurality of wireless or wired broadcast television signals.

In some embodiments, the communicator 220 is a component in communication with an external device or an external server according to various types of communication protocols. For example, the communicator may include at least one of a WiFi module, a Bluetooth module, a wired Ethernet module, other network communication protocol chip or near-field communication protocol chip, and an infrared receiver. The display apparatus 200 may establish a communication channel for sending and receiving of control signals and data signals with the control device 100 or the server 400 through the communicator 220.

The detector 230 is configured to collect external environment signals or signals for interacting with outside. For example, the detector 230 includes a light receiver, which is a sensor configured to collect the intensity of the ambient light; or the detector 230 includes an image collector, such as a camera, which may be configured to collect external environment scenes, user attributes or user interaction gestures; or the detector 230 includes a sound collector, such as a microphone, which is configured to receive external sounds.

In some embodiments, the external device interface 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB port and the like; or may be a composite input/output interface formed by the above-mentioned interfaces.

In some embodiments, the processor 250 and the modem 210 may be located in different separate devices, that is, the modem 210 may also be located in an external device (such as an external set-top box, etc.) of the main device where the processor 250 is located.

In some embodiments, the processor 250 controls the operations of the display apparatus and responds to the user's operations through various software programs stored in the memory. The processor 250 controls the overall operation of the display apparatus 200. For example, in response to a user command for selecting a UI object displayed on the display 260, the processor 250 may perform the operations related to the object selected by the user command.

In some embodiments, the object may be any one of selectable objects, such as a hyperlink, an icon, or other areas available for selection. The operations associated with the selected object include: the operation to display the link to the hyperlinked page, document, image or the like, or the operation to execute the application associated with the icon.

The CPU is configured to run the operating system and execute application instructions stored in the memory, and run various applications, data and contents according to various interactive commands from outside so as to finally display various audio and video contents. The CPU may include a plurality of processors, for example, including a main processor and one or more auxiliary processors.

In some embodiments, the GPU is used to generate various graphics objects, such as at least one of icons, operation menus, graphics of user command input, etc. The GPU includes: an arithmetic unit that performs operations by receiving various interactive commands input from users and displays various objects according to the display attributes, and a renderer that renders various objects obtained based on the arithmetic unit and displays the rendered objects on the screen.

In some embodiments, the video processor is configured to receive an external video signal and perform at least one of decompression, decoding, scaling, noise reduction, frame rate conversion, resolution conversion, image synthesis and other video processing according to the standard codec protocol of the input signal, to obtain a signal that can be displayed or played directly on the display apparatus 200.

In some embodiments, the video processor includes a de-multiplexing module, a video decoding module, an image synthesis module, a frame rate conversion module, a display formatting module, etc. Here, the de-multiplexing module is used to de-multiplex the input audio and video data stream, e.g., the MPEG-2 signal, and the de-multiplexing module de-multiplexes it into a video signal and an audio signal, etc. The video decoding module is used to process the de-multiplexed video signal, including decoding and scaling, etc. The image synthesis module, such as image synthesizer, is used to superimpose and mix a GUI signal generated by a graphics generator itself or according to the user input with the scaled video image, to generate an image signal for display on the display. The frame rate conversion module is configured for conversion of an input video frame rate. The display formatting module is configured to receive a video output signal after frame rate conversion and convert the signal to a signal compatible with a display format, for example, outputting an RGB data signal.

In some embodiments, the audio processor is configured to receive an external audio signal and performs at least one of decompression, decoding, denoising, digital-to-analogue conversion, amplification processing or other processing according to a standard codec protocol of the input signal so as to obtain a sound signal that can be played in a speaker.

In some embodiments, the user may input a user command on the GUI presented on the display 260, and the user input interface receives a user command through the GUI. Alternatively, the user may input a user command by inputting a particular sound or gesture, and the user input interface recognizes the sound or gesture through the sensor to receive the user command.

In some embodiments, the user input interface 280 may be an interface for receiving a control input (for example: physical keys on the body of the display apparatus, or others).

In some embodiments, a system of the display apparatus may include a kernel, a command parser (shell), a file system and applications. The kernel, the shell and the file system form a basic structure of the operating system and allow the user to control the file management, application running and use the system. When powered on, the kernel is started, a kernel space is activated, hardware is abstracted, hardware parameters are initialized, and a virtual memory, a scheduler, a signal and interprocess communication (IPC) are run and maintained. After the kernel is started, the shell and applications are loaded. The applications, after being started, are compiled to machine codes to create a process.

Figure 4:
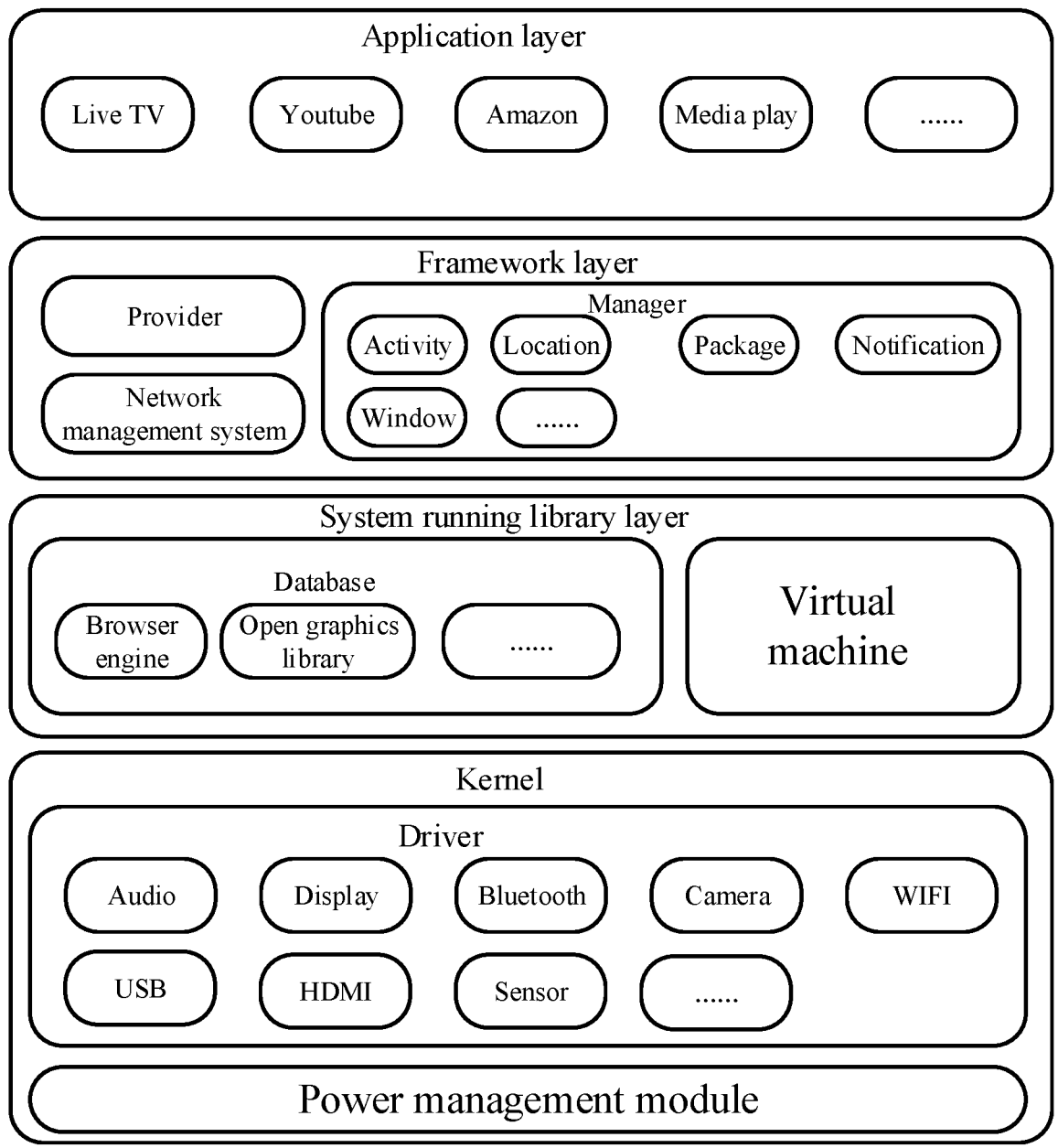
FIG. 4 shows a diagram of software configuration of a display apparatus 200 according to some embodiments.

Referring to FIG. 4, in some embodiments, the system is divided into four layers, which includes an application layer, an application framework layer ("framework layer" for short), an Android runtime and system library layer (system run library layer), and a kernel layer from top to bottom.

In some embodiments, at least one application runs in the application layer, and these applications may be a window application, a system set program or a clock application and the like built in the operating system; or may be an application developed by a third party developer. During specific implementations, the applications in the application layer include but not limited to the above examples.

The framework layer provides an application programming interface (API) and a programming framework for the applications in the application layer. The application framework layer includes some predefined functions. The application framework layer functions as a processing center, which causes applications in the application layer to take an action. The applications may access resources in the system and obtain services of the system through API interfaces.

As shown in FIG. 4, the application framework layer in embodiments of the disclosure includes a manager, a content provider, etc., and the manager includes at least one of: an Activity Manager used to interact with all activities running in the system, a Location Manager used to provide system services or applications with access to system location services, a Package Manager used to retrieve various information related to application packages currently installed on the device, a Notification Manager used to control the display and removal of notification messages, or a Window Manager used to manage icons, windows, toolbars, wallpapers and Desktop widget on the user interface.

The activity manager is used to manage a life cycle of an application and the general navigation function, such as exit (including: switching a user interface currently presented in the display window to a system desktop interface), launching, back (including: switching a user interface currently presented in the display window to a upper-level user interface of the currently presented user interface), etc. of the application. The window manager is used to manage all the window applications, for example, obtain size of the display screen, determine whether there is a status bar, lock a screen, capture a screen, control update of the display window (for example, scaling a display window, dithering display, twist deformation display, etc.), etc.

The system runtime library layer provides support for the upper layer, for example, the framework layer. When the framework layer runs, the Android operating system will run the C/C++ library included in the system runtime library layer to implement the function(s) to be implemented by the framework layer.

The kernel layer is a layer between hardware and software. As shown in FIG. 4, the kernel layer includes at least one of: audio driver, display driver, Bluetooth driver, camera driver, WIFI driver, USB driver, HDMI driver, sensor driver (such as fingerprint sensor, temperature sensor, touch sensor, pressure sensor, etc.), etc.

FIGS. 5-10 show schematic diagrams of user interfaces on the display apparatus 200.

Figure 5:
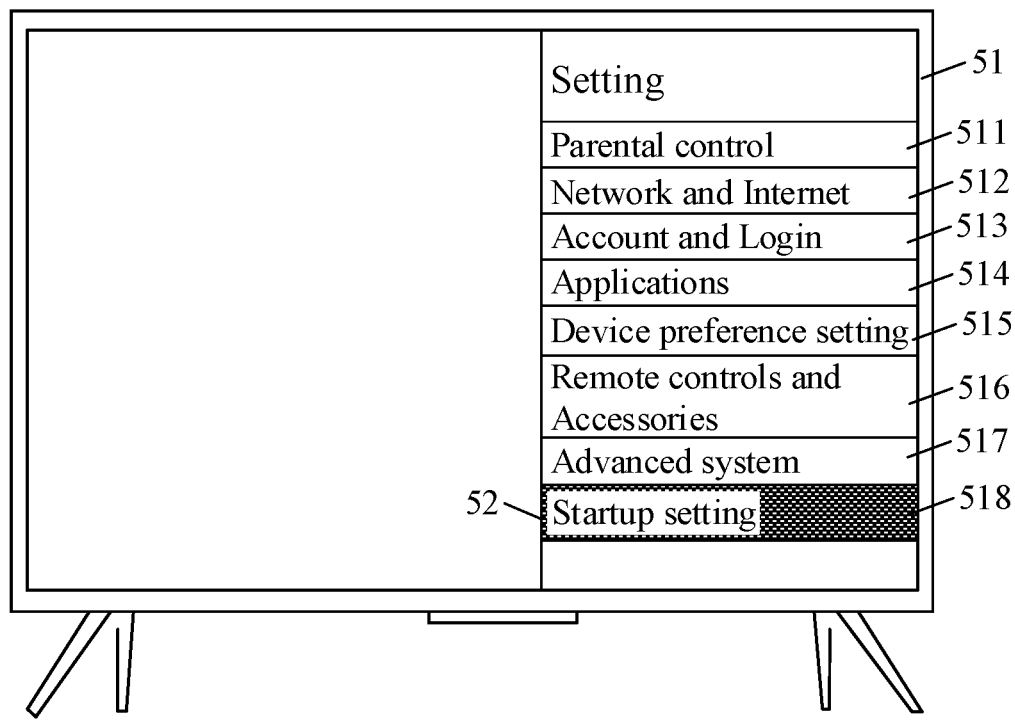
FIGS. 5-10 show schematic diagrams of user interfaces according to some embodiments.

As shown in FIG. 5, the display apparatus may provide a user interface for settings to the display, and the user interface includes a presentation area 51 for settings. The presentation area 51 includes controls 511-518 provided for the user, and the controls 511-518 are for parental control, network and internet, account and login, applications, device preference setting, remote controls and accessories, advanced system, and startup setting, respectively. The user interface also includes a selector 52 for indicating that any one of the controls is selected. For example, the selector 52 indicates that the control for startup setting is selected currently.

It should be noted that the controls refer to visual objects displayed in each presentation area of the user interface in the display apparatus 200 to represent corresponding content such as an icon, a thumbnail, a video clip, a link and the like. These controls can provide a user with various traditional program contents received through data broadcasting, as well as various application and service contents provided by a content provider.

The controls can be shown in various forms. For example, the controls may include text contents and/or images for displaying thumbnails related to the text contents, or video clips related to texts. As another example, the control may be a text and/or icon for an application.

It should also be noted that the selector indicates that one of the controls has been selected, such as a focus object. In some embodiments, based on the user's input via the control device 100, a control can be selected or controlled by controlling a movement of the focus object displayed on the display apparatus 200. For example, the user can select and control a control by controlling the movement of the focus object among the controls via direction keys on the control device 100. In some embodiments, based on the user's input via the control device 100, a control may be selected or controlled by a focus object by controlling a movement of each control displayed on the display apparatus 200. For example, the user can control all the controls to move left or right simultaneously via the direction keys on the control device 100, so that the focus object can select and control a control while keeping a position of the focus object unchanged.

The selector can indicate a selection in various forms. For example, a position of the focus object can be indicated or identified by enlarging the control, a position of the focus object can be indicated or identified by setting a background color of the control, or a position of the focus object can be indicated by changing the border line, size, color, transparency and outline of the text or image, and/or font and the like of the control with the focus.

Figure 6:
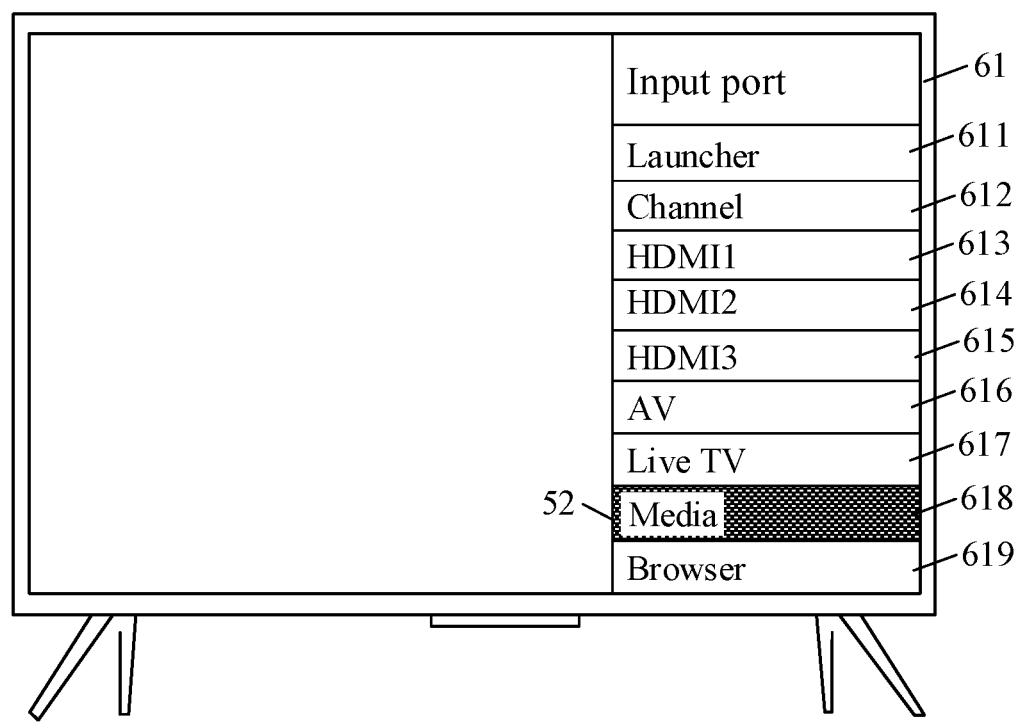

In FIG. 5, after the user presses a confirm key on the control device, in some embodiments, the display apparatus provides another user interface in response to the input command, as shown in FIG. 6.

As shown in FIG. 6, the display apparatus may provide a user interface for startup setting to a display, and the user interface includes a presentation area 61 which is an input port. The presentation area 61 includes controls 611-619 provided for a user. The controls 611-619 are respectively for the launcher (start homepage), channel, high definition multimedia interface 1 (HDMI1), HDMI2, HDMI3, AV (digital signal source), live TV (an application), media and browser. The user interface also includes a selector 52 for indicating that any one of controls is selected. The selector 52 indicates that the control for the media is selected currently as shown in FIG. 6. After the user presses the confirm key on the control device, when the device starts again after shutdown, and the user interface corresponding to the media will be displayed in this case. If the user selects the AV source, when the device starts again after shutdown, and the user interface corresponding to the AV source will be displayed. If the user selects the launcher (startup homepage), when the device starts again after shutdown, and the interface corresponding to the launcher (startup homepage) will be displayed.

Figure 7:
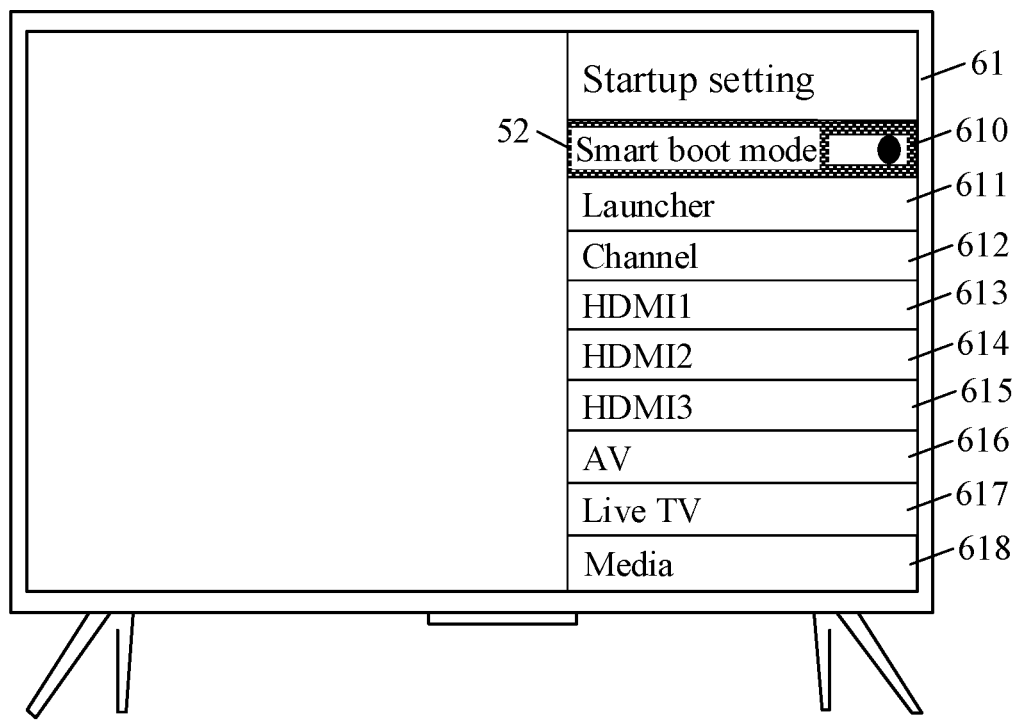

In FIG. 5, after the user presses the confirm key on the control device, in some embodiments, the display apparatus provides another a user interface in response to the input command, as shown in FIG. 7.

Figure 8:
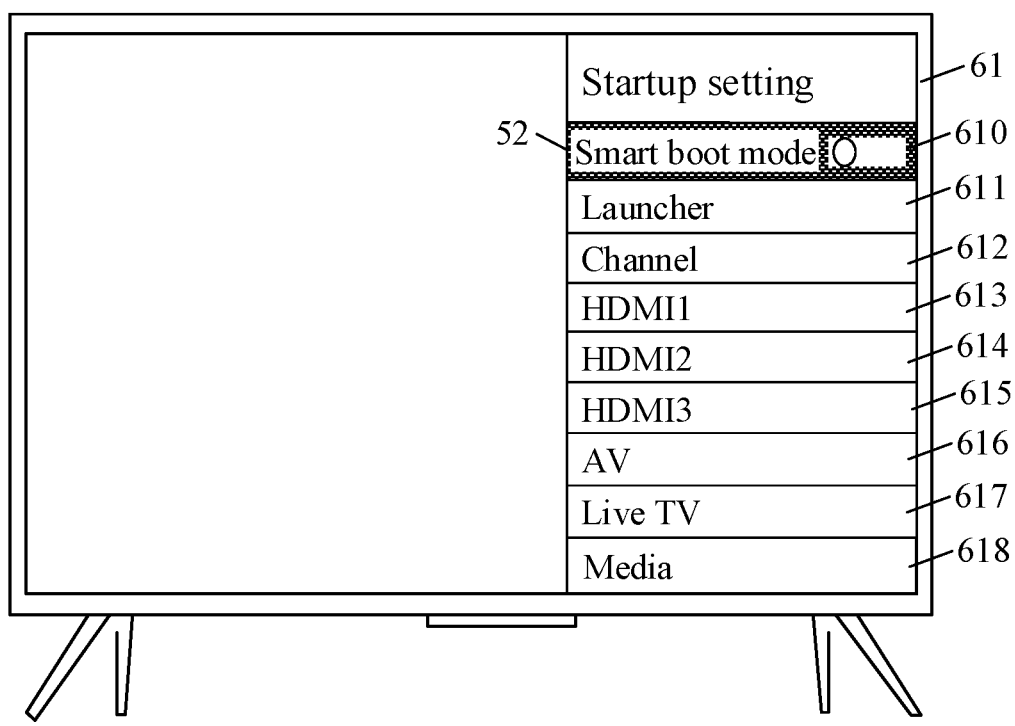
Figure 9:
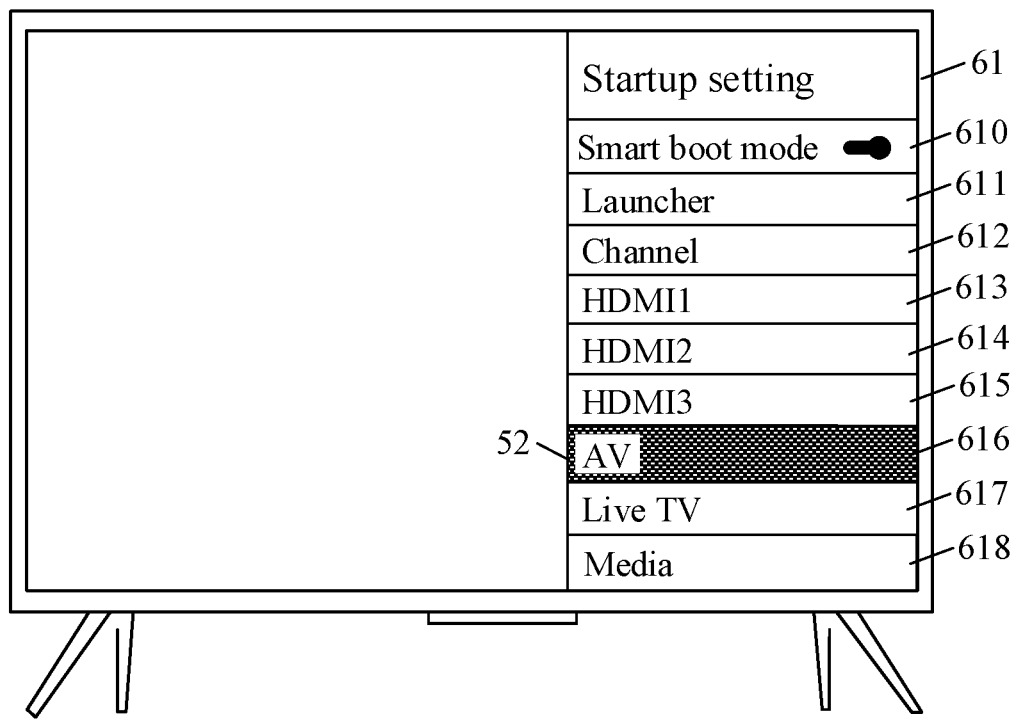

As shown in FIG. 7, the display apparatus may provide a user interface for the startup setting to a display, and the user interface includes a presentation area 61 which is for the startup setting. The presentation area 61 includes controls 610-618 provided for a user. The controls 610-618 are respectively the smart boot mode, launcher (startup homepage), channel, HDMI1, HDMI 2, HDMI3, AV (digital signal source), live TV (an application) and media. The user interface also includes a selector 52 indicating that any one of controls is selected. In this case, the smart boot mode is in an on state, and the current selector 52 indicates that the control for smart boot mode is selected. After the user presses the confirm key on the control device, as shown in FIG. 8, the smart boot mode is in an off state, and the controls 611-618 are unavailable and in a state that cannot be selected. As shown in FIG. 8, the selector 52 indicates that the control for the smart boot mode is selected in this case, and when the user presses the confirm key on the control device, as shown in FIG. 7, the smart boot mode is in an on state and the controls 611-618 are available. As shown in FIG. 7, when the user presses the direction key on the control device, as shown in FIG. 9, the selector 52 indicates that the control for AV (digital signal source) is selected in this case; and after the user presses the confirm key on the control device, when the device starts again after shutdown, and the user interface corresponding to the AV source will be displayed.

In some embodiments, the display apparatus may provide a display with a user interface for a physical signal source. When a user wants to change an input signal source or set a startup interface, the user may press a key on the control device to enter a user interface shown in FIG. The user interface includes a presentation area 71 which is an input port. The presentation area 71 includes controls 711-718 provided for the user. The controls 711-718 are respectively for the channel, HDMI1, HDMI2, HDMI3, HDMI4, AV (digital signal source), live TV (an application) and startup setting. The user interface also includes a selector 52 for indicating that any one of controls is selected. The selector 52 indicates that the control for the startup setting is selected in this case, and when the user presses the confirm key on the control device, the user interface shown in FIG. 6 or FIG. 7 is entered.

In the related art, when the display apparatus is powered on, by default it enters a homepage of launcher (as a desktop for Android system) or an interface for a physical source (channel) that was accessed immediately before, or it enters an application when it is woken up by pressing a key corresponding to the application on a remote control. The current standard boot process for the display apparatus is fixed without user's participation, and completely customized by the manufacturer, so that it is not suitable for specific scenarios or user's favorite modes, and the user experience is poor.

Figure 11:
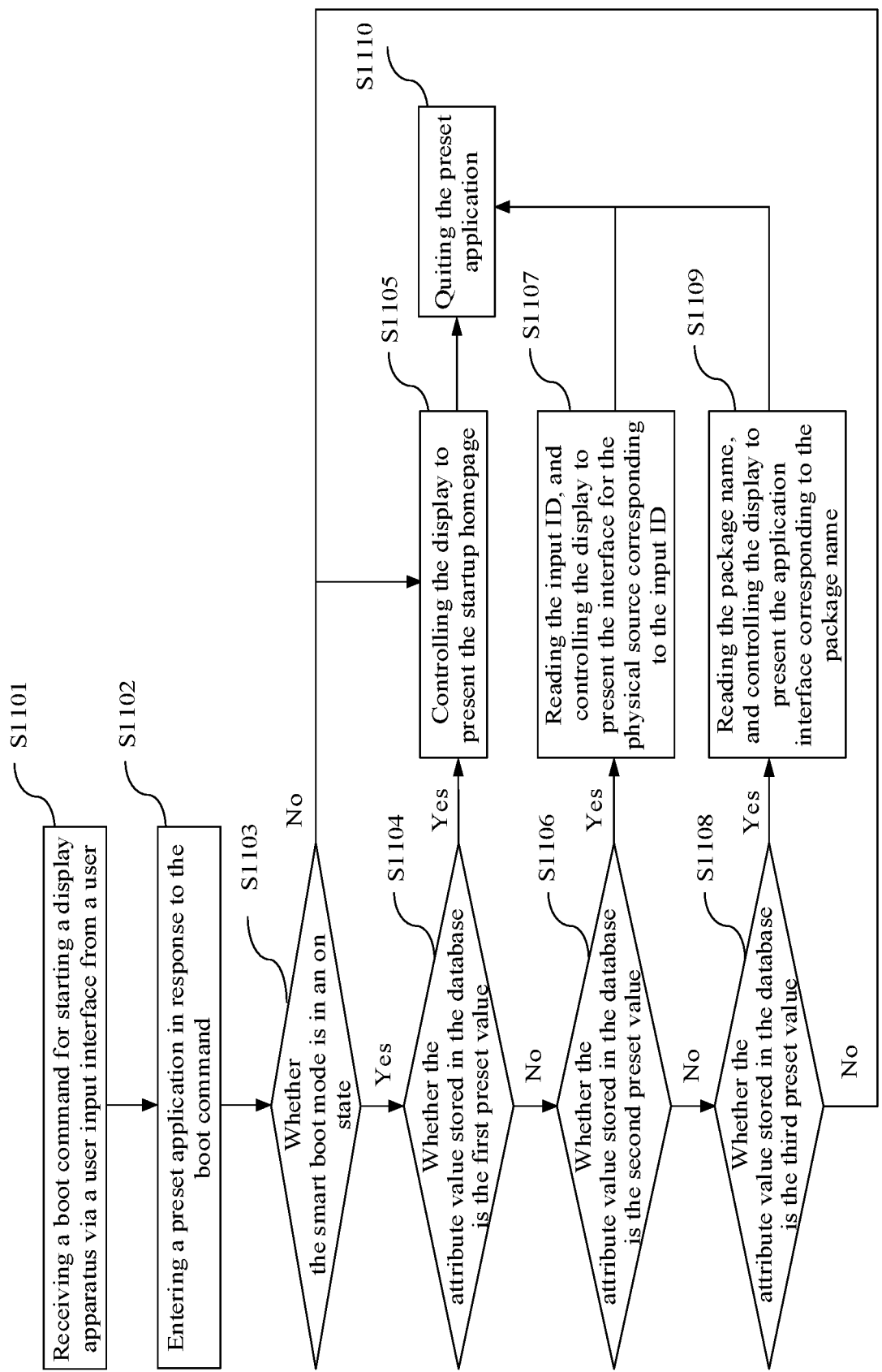
FIG. 11 shows a flowchart of a method for displaying a boot user interface according to some embodiments.

In view of the above issues, embodiments of the present disclosure provide a method for displaying a boot user interface. With reference to FIG. 11, the method includes the following steps.

Step S1101: receiving a boot command for starting a display apparatus via a user input interface from a user.

For example, the boot command can a command implemented by the user through pressing a power button on the control device of the display apparatus.

Step S1102: entering a preset application in the display apparatus in response to the boot command input from the user.

In some embodiments, after the display apparatus is powered on, a preset application is entered by default, where the preset application can be a first user interface of the Android system visible for the user. The preset application may be the FallbackHome application, which is the default application when powered on, and only displays a black screen. The black screen may prevent the user from seeing a blurry screen or unstable signal that occurs in the background during operation. The preset application may also be the launcher homepage, which can also prevent the user from seeing a blurry screen or unstable signal that occurs in the background during operation.

Step S1103: detecting whether a smart boot mode configured in the display apparatus is in an on state.

Figure 10:
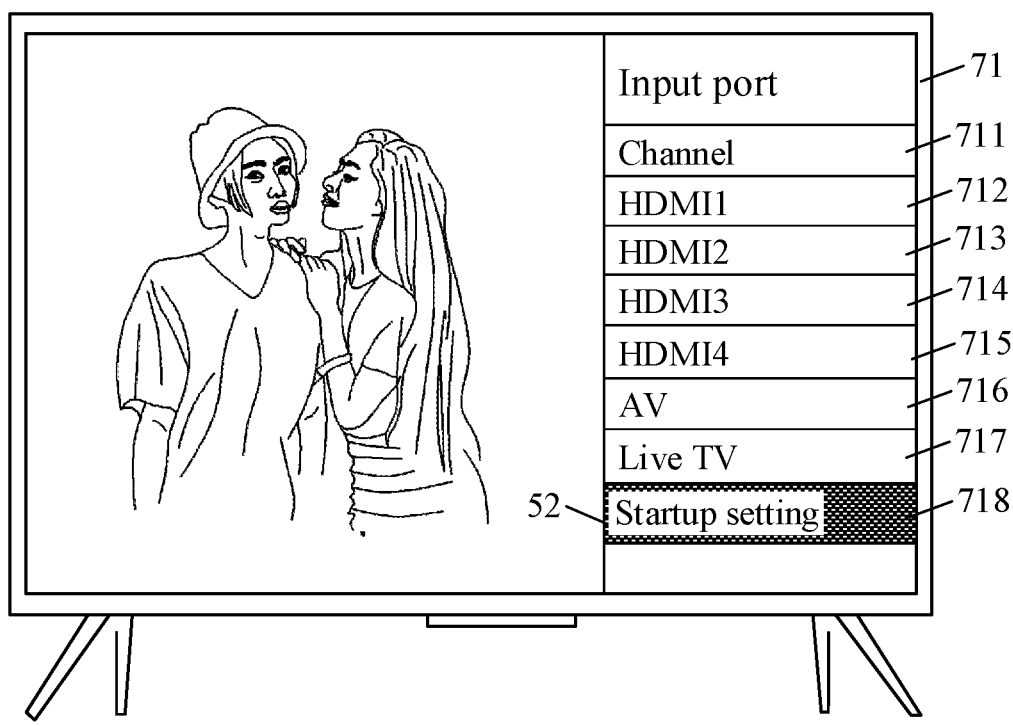

In some embodiments, after the user selects the startup setting option in the setting user interface shown in FIG. 5 or the source menu interface shown in FIG. 10, a switch button of the smart boot mode is displayed as shown in FIG. 7. When the user selects the smart boot mode to be on, the bootSwitch is stored as 1 in the Settings.Global database (a native database in the display apparatus), and the menu becomes editable. In this case, the boot user interface can be selected according to the user's needs. When the device starts again, it enters the smart boot mode and directly enters the boot user interface selected by the user. When the user selects the smart boot mode to be off, the bootSwitch is stored as 0 in the Settings.Global database, and the menu cannot be edited. The device enters the default mode when starts again.

In some embodiments, a step of detecting whether the smart boot mode is in an on state includes: if the bootSwitch stored in the Settings.Global database is a first value (for example, 1), determining that the smart boot mode is in the on state; and if the bootSwitch stored in the Settings.Global database is a second value different from the first value (for example, 0), determining that the smart boot mode is in an off state.

If the smart boot mode is in the on state, the flow goes to step S1104.

In some embodiments, the user may select the user boot interface after starting the smart boot mode. When the user selects the launcher homepage, the bootType (boot type value, which is an attribute value) in the Settings.Global database is stored as 0, and the bootID (startup ID) is the launcher's packageName (package name). When the user selects a physical signal source (such as TV/HDMI/AV, etc.), the corresponding bootType in the Settings.Global database is stored as 1, and the bootID is the InputID (input ID) of the corresponding physical signal source. When the user selects an application, the bootType in the Settings-.Global database is stored as 2, and the bootID is stored as the package name of the application.

Step S1104: determining whether the attribute value for indicating bootType stored in the database is the first preset value.

If the attribute value stored in the database is the first preset value, the flow goes to step S1105.

Step S1105: controlling the display to present the startup homepage.

The flow goes to step S1110 after step S1105.

In some embodiments, it is detected whether the bootType stored in the database is 0, if the bootType is 0, the Android's native logic for booting into the launcher is invoked, the FallbackHome application exits, and the black screen disappears.

If the attribute value stored in the database is not the first preset value, the flow goes to step S1106.

Step S1106: determining whether the attribute value stored in the database is the second preset value. If the attribute value stored in the database is the second preset value, the flow goes to step S1107.

Step S1107: reading an input ID, and controlling the display to present the interface of the physical source corresponding to the input ID.

The flow goes to step S1110 after step S1107.

In some embodiments, it is detected whether the bootType stored in the database is 1, if the bootType is 1, the bootID value is read as InputID. In this case, the TIF framework of Android is invoked to select the corresponding InputID for starting, the corresponding physical signal source is displayed, the FallbackHome application exits, and the black screen disappears.

If the attribute value stored in the database is not the second preset value, the flow goes to step S1108.

Step S1108: determining whether the attribute value stored in the database is the third preset value. If the attribute value stored in the database is the third preset value, the flow goes to step S1109.

Step S1109: reading a package name, and controlling the display to display the application interface corresponding to the package name.

The flow goes to step S1110 after step S1109.

In some embodiments, it is detected whether the bootType stored in the database is 2, and if the bootType is 2, the bootID value is read as packageName. In this case, the native application opening interface of the Android system is called to open the corresponding application, the FallbackHome application exits, and the black screen disappears.

If the attribute value stored in the database is not the third preset value, the flow goes to step S1105.

Step S1110: exits from the preset application.

In some embodiments, if the bootType is not 2, the Android's native logic for booting into the launcher is called, the FallbackHome application exits, and the black screen disappears.

If the smart boot mode is in an off state, the flow goes to step S1105.

In the above embodiments, the user selects the boot mode through the menu, and selects a physical signal source or startup homepage or a specific application as the boot interface according to the user's own needs and preferences. When the user inputs a boot command, if it is detected that the smart boot mode is in an on state, the boot interface selected by the user is directly displayed according to the attribute value stored in the database, so as to improve the user experience.

Embodiments of the present disclosure provide a display apparatus, including: a display; and a memory configured to store instructions and data associated with the display; and at least one processor in connection with the display and the memory, and configured to execute the instructions to cause the display apparatus to perform: receiving a boot command from the user, in response to the boot command corresponding to a preset key on the control device, determining a boot user interface according to an attribute value stored in the database; and controlling the display to present the boot user interface.

In some embodiments of the present disclosure, the at least one processor is configured to execute the instructions to cause the display apparatus to perform: in response to the attribute value stored in the database being the first preset value, determining that the boot user interface is the startup homepage.

In some embodiments of the present disclosure, the at least one processor is configured to execute the instructions to cause the display apparatus to perform: in response to the attribute value stored in the database being the second preset value, reading a startup ID including an input ID; and determining that the boot user interface is the interface for the physical signal source corresponding to the input ID.

In some embodiments of the present disclosure, the at least one processor is configured to execute the instructions to cause the display apparatus to perform: in response to the attribute value stored in the database being the third preset value, reading the startup ID including a package name of the application; and determining that the boot user interface is an application interface corresponding to the package name.

Embodiments of the present disclosure also provide a display apparatus, including: a display; and a memory configured to store instructions and data associated with the display; and at least one processor in connection with the display and the memory, and configured to execute the instructions to cause the display apparatus to perform: receiving a command from a user, in response to the command corresponding to a preset key on the control device, determining the user interface according to an attribute value stored in the database; and controlling the display to present the user interface.

In some embodiments of the present disclosure, the at least one processor is configured to execute the instructions to cause the display apparatus to perform: in response to the attribute value stored in the database being the first preset value, determining that the user interface is the startup homepage.

In some embodiments of the present disclosure, the at least one processor is configured to execute the instructions to cause the display apparatus to perform: in response to the attribute value stored in the database being the second preset value, reading a startup ID including an input ID; and determining that the user interface is the interface for the physical signal source corresponding to the input ID.

In some embodiments of the present disclosure, the at least one processor is configured to execute the instructions to cause the display apparatus to perform: in response to the attribute value stored in the database being the third preset value, reading the startup ID including a package name of an application; and determining that the user interface is the application interface corresponding to the package name.

Embodiments of the present disclosure also provide a display method, including: receiving a boot command input from the user, in response to the boot command corresponding to a preset key on the control device, determining the boot user interface according to an attribute value stored in the database; and controlling the display to present the boot user interface.

Embodiments of the present disclosure also provide a display method, including: receiving a command from a user, in response to the input command corresponding to a preset key on the control device, determining the user interface according to an attribute value stored in the database; and controlling the display to present the user interface.

FIGS. 12-15 show schematic diagrams of user interfaces on the display apparatus 200.

Figure 12:
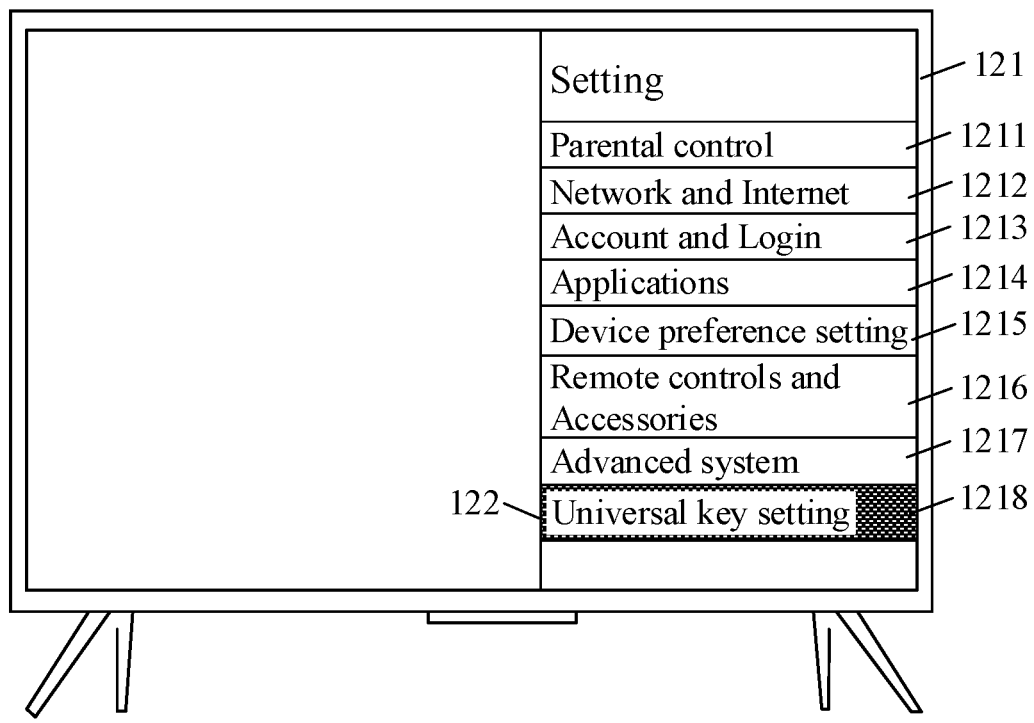
FIGS. 12-15 show schematic diagrams of user interfaces according to some embodiments.
Figure 16:
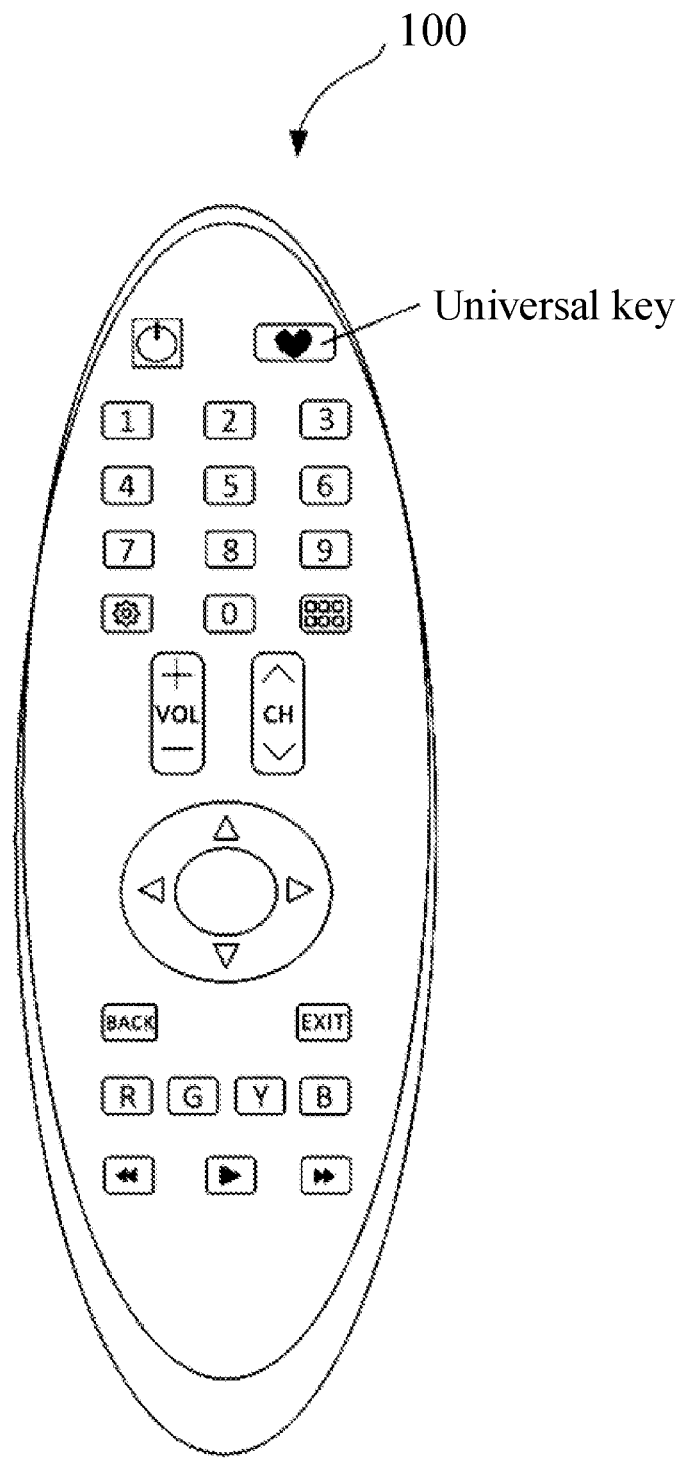
FIG. 16 shows a schematic diagram of a control device according to some embodiments.

As shown in FIG. 12, the display apparatus may provide a user interface for setting to the display, and the user interface includes a presentation area 121 for setting. The presentation area 121 includes controls 1211-1218 provided for the user. The controls 1211-1218 are for parental control, network and internet, account and login, applications, device preference setting, remote controls and accessories, advanced system and universal key setting, respectively. The user interface also includes a selector 122 indicating that any of controls is selected. The selector 122 indicates that the control for the universal key setting is selected in this case. A certain key of the existing control device may be designated as the universal key, or a special key may be set in the control device as the universal key, as shown in FIG. 16.

Figure 13:
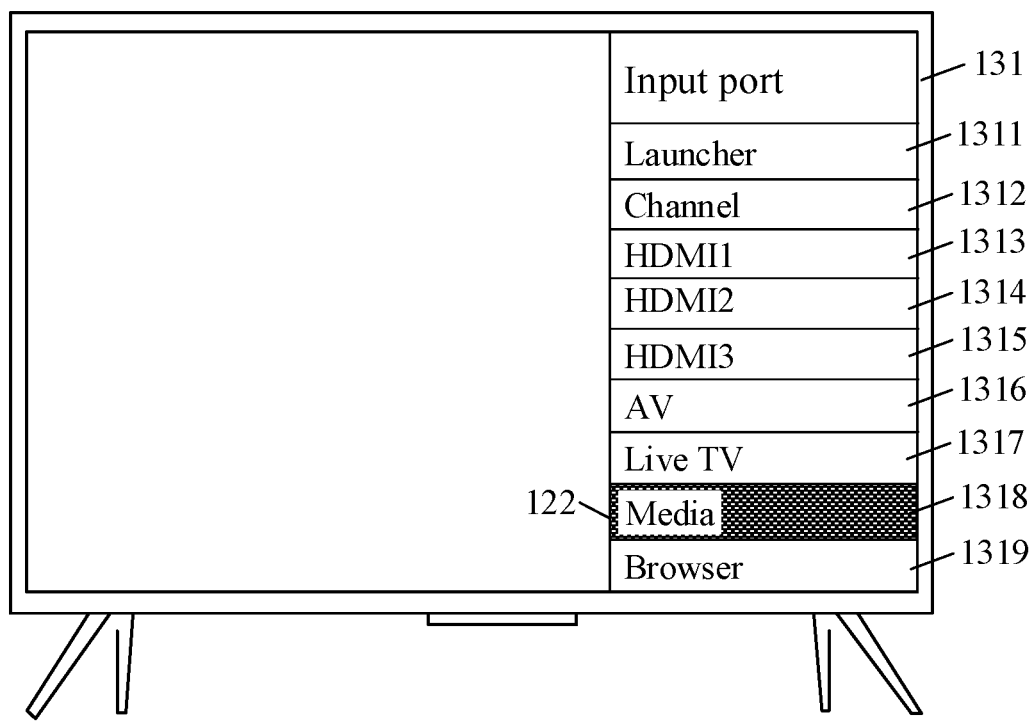

As shown in FIG. 12, after the user presses the confirm key on the control device, in some embodiments, the display apparatus provides a user interface in response to the input command, as shown in FIG. 13.

As shown in FIG. 13, the display apparatus can provide a user interface for setting the universal key for the display apparatus, and the user interface includes a presentation area 131 which is an input port. The presentation area 131 includes controls 1311-1319 provided for a user. The controls 1311-1319 are respectively for launcher (startup homepage), channel, HDMI1, HDMI2, HDMI3, AV (digital signal source), live TV (an application), media and browser. The user interface also includes a selector 122 for indicating that any one of controls is selected. The selector 122 indicates that the control for the media is selected in this case, after the user presses the confirm key on the control device, when the device starts again after shutdown in response to the universal key as shown in FIG. 16 being selected by the user, the user interface corresponding to the media will be displayed in this case. If the user selects the AV source, when the device starts again after shutdown in response to the universal key as shown in FIG. 16 being selected by the user, the user interface corresponding to the AV source will be displayed. If the user selects the launcher (startup homepage), when the device starts again after shutdown in response to the universal key as shown in FIG. 16 being selected by the user, and the launcher (startup homepage) interface will be displayed.

Figure 14:
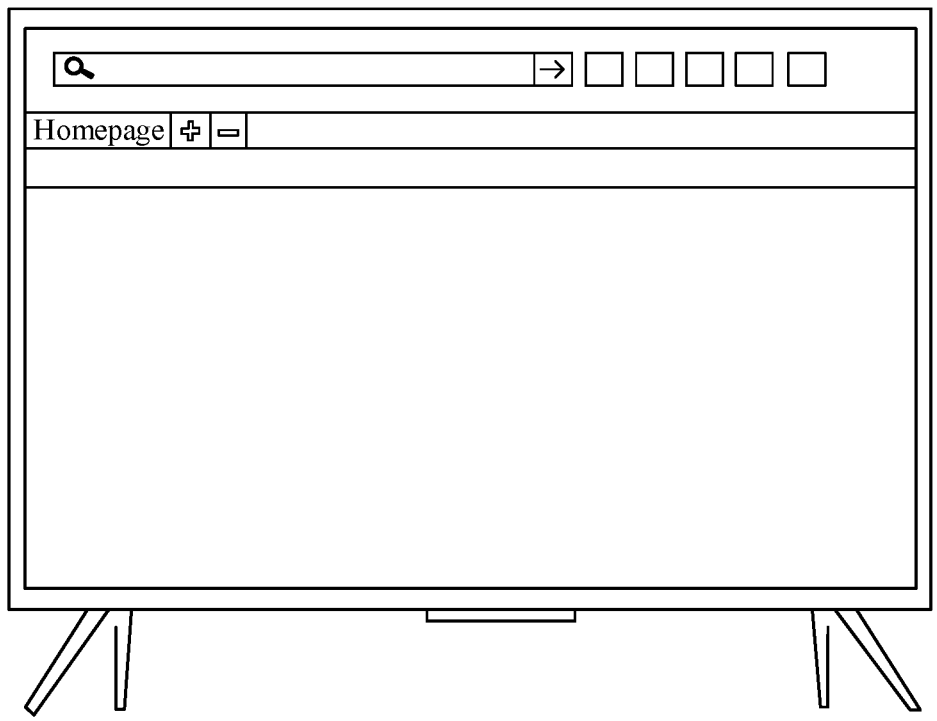
Figure 15:

In some embodiments, the user selects live TV as the user interface corresponding to the universal key in the user interface for setting the universal key as shown in FIG. 13. When the user is using the browser application, the user interface is shown in FIG. 14. In this case, after the user presses the universal key as shown in FIG. 16, the user interface will skip to the user interface of Live TV shown in FIG. 15.

In the related art, the display apparatus is woken up by one key such as a power key or a specific application key on the control device. When the display apparatus is powered on, by default it enters a homepage of launcher (as a desktop for Android system) or an interface for a physical source (channel) that was accessed immediately before, or it enters an application when it is woken up by pressing a key corresponding to the application on a remote control. The current standard boot process for the display apparatus is fixed without user's participation, and completely customized by the manufacturer, so that it is not suitable for specific scenarios or user's favorite modes, and the user experience is poor.

Figure 17:
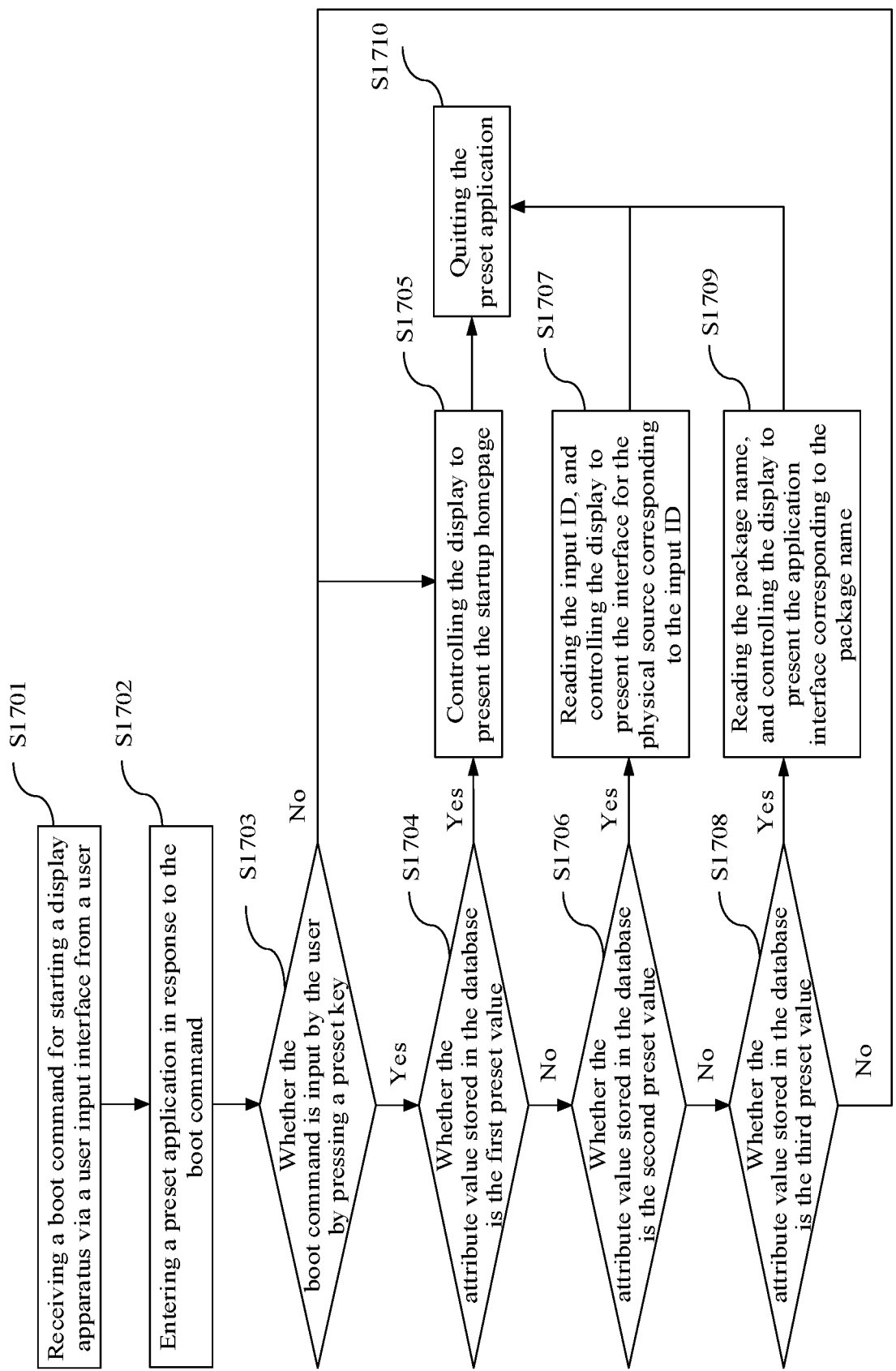
FIG. 17 shows a flowchart of a method for displaying a boot user interface according to some embodiments.

The embodiments of the present disclosure provide a method for displaying a boot user interface. With reference to FIG. 17, the method includes the following steps.

Step S1701: receiving a boot command for starting a display apparatus via a user input interface from a user.

For example, the boot command can be received via the user input interface and may be implemented by pressing the universal key shown in FIG. 16 on the control device, or through pressing a power button on the control device.

Step S1702: entering a preset application in response to the boot command from the user.

In some embodiments, after the display apparatus is powered on, a preset application is entered by default, where the preset application is a first user interface of the Android system visible for the user. The preset application may be the FallbackHome application, which is the default application when powered on, and only displays a black screen. The black screen may prevent the user from seeing a blurry screen or unstable signal that occurs in the background during operation. The preset application may also be the launcher homepage, which can also prevent the user from seeing a blurry screen or unstable signal that occurs in the background during operation.

Step S1703: determining whether the boot command is input by pressing a preset key on the control device.

In some embodiments, when the display apparatus boots by pressing a key on the control device, the underlying driver obtains the key command. The key values of the normal boot key and the universal key are different, and the key value can be used for determining whether the current boot command corresponds to the universal key.

In some embodiments, the step of detecting whether the boot command is input by pressing a preset key on the control device includes: detecting whether the wakeup-reason in the Settings.Global database is the key value of the universal key.

If the boot command is input by pressing a preset key on the control device, the flow goes to step S1704.

In some embodiments, the user sets the user interface corresponding to the universal key on the user interface for setting the universal key as shown in FIG. 13. When the user selects the launcher homepage, the keyType (key type value, which is an attribute value) in the Settings.Global database is stored as 0, and the keyID (key ID) is the launcher's packageName (package name). When the user selects a physical signal source (such as TV/HDMI/AV, etc.), the Settings.Global database stores the corresponding keyType as 1, and the keyID is the InputID (input ID) of the corresponding physical signal source. When the user selects an application, the Settings.Global database stores the keyType as 2 and the keyID as the application's package name.

Step S1704: determining whether the attribute value stored in the database is the first preset value. If the attribute value stored in the database is the first preset value, the flow goes to step S1705.

Step S1705: controlling the display to present the startup homepage.

The flow goes to step S1710 after step S1705.

In some embodiments, it is detected whether the keyType stored in the database is 0, if the keyType is 0, the Android's native logic for booting into the launcher is called, the FallbackHome application exits, and the black screen disappears.

If the attribute value stored in the database is not the first preset value, the flow goes to step S1706.

Step S1706: determining whether the attribute value stored in the database is the second preset value. If the attribute value stored in the database is the second preset value, the flow goes to step S1707.

Step S1707: reading the input ID, and controlling the display to present the interface for the physical source corresponding to the input ID.

The flow goes to step S1710 after step S1707.

In some embodiments, it is detected whether the keyType stored in the database is 1, if the keyType is 1, the keyID value is read as InputID, the TIF framework of Android is invoked to select the corresponding InputID for starting, the corresponding physical signal source is displayed, the FallbackHome application exits, and the black screen disappears.

If the attribute value stored in the database is not the second preset value, the flow goes to step S1708.

Step S1708: determining whether the attribute value stored in the database is the third preset value. If the attribute value stored in the database is the third preset value, the flow goes to step S1709.

Step S1709: reading a package name, and controlling the display to present the application interface corresponding to the package name.

The flow goes to step S1710 after step S1709.

In some embodiments, it is detected whether the keyType stored in the database is 2, if the keyType is 2, the keyID value is read as packageName, and the native application opening interface of the Android system is called to launch the corresponding application, the FallbackHome application exits, and the black screen disappears.

If the attribute value stored in the database is not the third preset value, the flow goes to step S1705.

Step S1710: exiting from the preset application.

In some embodiments, if the keyType is not 2, the Android native logic for booting into the launcher is called, the FallbackHome application exits, and the black screen disappears.

If the boot command is not input by pressing a preset key on the control device, the flow goes to step S1705.

Figure 18:
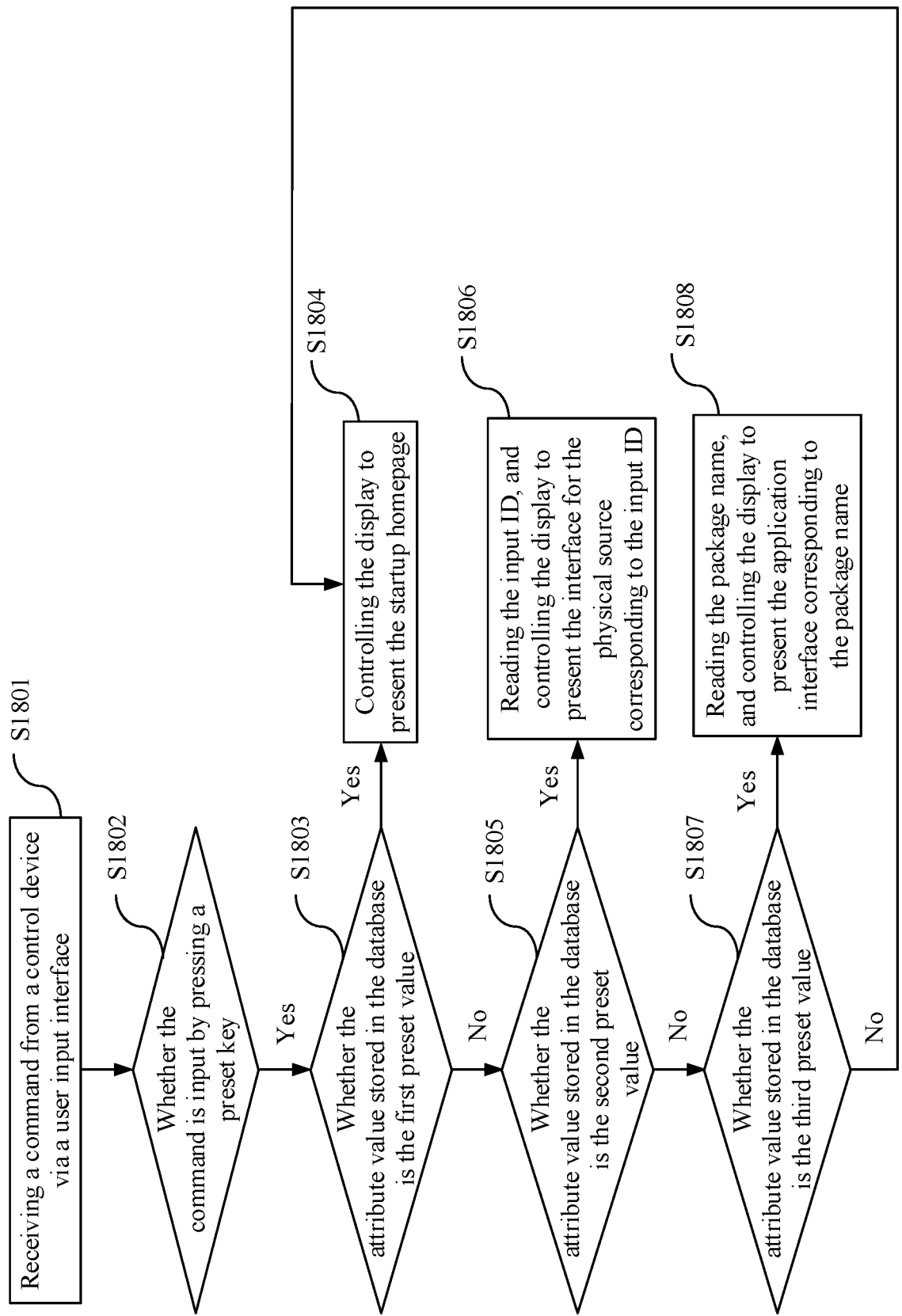
FIG. 18 shows a flowchart of a method for displaying a user interface according to some embodiments.

Embodiments of the present disclosure provide a method for displaying a user interface. With reference to FIG. 18, the method includes the following steps.

Step S1801: receiving a command from a control device via a user input interface.

For example, the command can be input by pressing the universal key shown in FIG. 16 on the control device.

Step S1802: in response to the command from the control device, determining whether the command is input by pressing a preset key on the control device. If the command is input by pressing a preset key on the control device, the flow goes to step S1803.

Step S1803: determining whether the attribute value stored in the database is the first preset value. If the attribute value stored in the database is the first preset value, the flow goes to step S1104.

Step S1804: controlling the display to present the startup homepage.

If the attribute value stored in the database is not the first preset value, the flow goes to step S1805.

Step S1805: determining whether the attribute value stored in the database is the second preset value. If the attribute value stored in the database is the second preset value, the flow goes to step S1806.

Step S1806: reading the input ID, and controlling the display to present the interface for the physical source corresponding to the input ID.

If the attribute value stored in the database is not the second preset value, the flow goes to step S1807.

Step S1807: determining whether the attribute value stored in the database is the third preset value. If the attribute value stored in the database is the third preset value, the flow goes to step S1808.

Step S1808: reading a package name, and controlling the display to present the application interface corresponding to the package name.

If the attribute value stored in the database is not the third preset value, the flow goes to step S1804.

In the above embodiments, the user sets the preset keys according to the user's own needs and preferences to open a certain physical signal source, a startup homepage or a user interface of a specific application. When the user inputs a boot command, if it is detected that the boot command is input by pressing a preset key on the control device, the boot interface selected by the user is directly displayed according to the attribute value stored in the database, so as to improve the user experience.

Embodiments of the present disclosure provide a display apparatus, including: a display; and a memory configured to store instructions and data associated with the display; and at least one processor in connection with the display and the memory, and configured to execute the instructions to cause the display apparatus to perform: receiving a user input for opening an input list, and controlling the display to present a user interface of the input list, where the user interface includes a channel control; receiving a user input for setting a source corresponding to a channel control, and controlling the display to present an interface for setting the source corresponding to the channel control, where the interface for setting the source corresponding to the channel control includes a control for a physical signal source and at least one control for a source of Internet television service; and receiving a user input for selecting the control for the source of the Internet television service, and executing an initialization operation corresponding to the control for the source of the Internet television service.

In some embodiments of the present disclosure, the at least one processor is configured to execute the instructions to cause the display apparatus to perform: obtaining an initialization intent corresponding to the control for the source of the Internet television service; if the initialization intent is not empty, initializing the channel information in the source of the Internet television service; and adding the channel information to the database.

In some embodiments of the present disclosure, the input list can be opened by pressing a first preset key on the control device; and the user input for setting the source corresponding to the channel control can be received in response to a time of pressing a second preset key on the control device after the channel control is selected exceeds a preset threshold.

Embodiments of the present disclosure provide a display apparatus, including: a display; and a memory configured to store instructions and data associated with the display; and at least one processor in connection with the display and the memory, and configured to execute the instructions to cause the display apparatus to perform: receiving a user input for opening an input list, and controlling the display to present a user interface of the input list, where the user interface includes a channel control; and receiving a user input of selecting the channel control, determining a source corresponding to the channel control, and playing the program corresponding to the source, where the source includes a physical signal source or a source for Internet television service, and the source corresponding to the channel control is preset by the user.

In some embodiments of the present disclosure, the at least one processor is configured to execute the instructions to cause the display apparatus to perform: receiving a user input of a selection for opening the channel list, and controlling the display to present the channel list corresponding to the source.

Embodiments of the present disclosure provide a source switching method, including: receiving a user input for opening an input list, and controlling the display to present a user interface of the input list, where the user interface includes a channel control; receiving a user input for setting a source corresponding to a channel control, and controlling the display to present an interface for setting the source corresponding to the channel control, where the interface for setting the source corresponding to the channel control includes a control for a physical signal source and at least one control for a source of Internet television service; and receiving a user input for selecting the control for the source of the Internet television service, and executing an initialization operation corresponding to the control for the source of the Internet television service.

In some embodiments of the present disclosure, the executing the initialization operation corresponding to the control for the source of the Internet television service specifically includes: obtaining an initialization intent corresponding to the control for the source of the Internet television service; if the initialization intent is not empty, initializing the channel information in the source of the Internet television service; and adding the channel information to the database.

In some embodiments of the present disclosure, the input list can be opened by pressing a first preset key on the control device; and the user input for setting the source corresponding to the channel control can be received in response to a time of pressing the second preset key on the control device after the channel control is selected exceeds a preset time.

The embodiments of the present disclosure provide a source program playing method, including: receiving a user input for opening an input list, and controlling the display to present a user interface of the input list, where the user interface includes a channel control; and receiving a user input of selecting the channel control, determining a source corresponding to the channel control, and playing the program from the source, where the source includes a physical signal source or a source for Internet television service, and the source corresponding to the channel control is preset by the user.

In some embodiments of the present disclosure, the method further includes: receiving a user input for a selection of opening the channel list, and controlling the display to present the channel list corresponding to the source.

In the related art, for the input list, merely physical signal sources such as an analog television (ATV) and HDMI are available for switch, while the over the top (OTT, Internet television service) virtual source is not available. Meanwhile, the setup (initialization) button of third-party OTT source is generally hidden below the multi-level menu, which is inconvenient to operate, resulting in a poor user experience.

Figure 19:
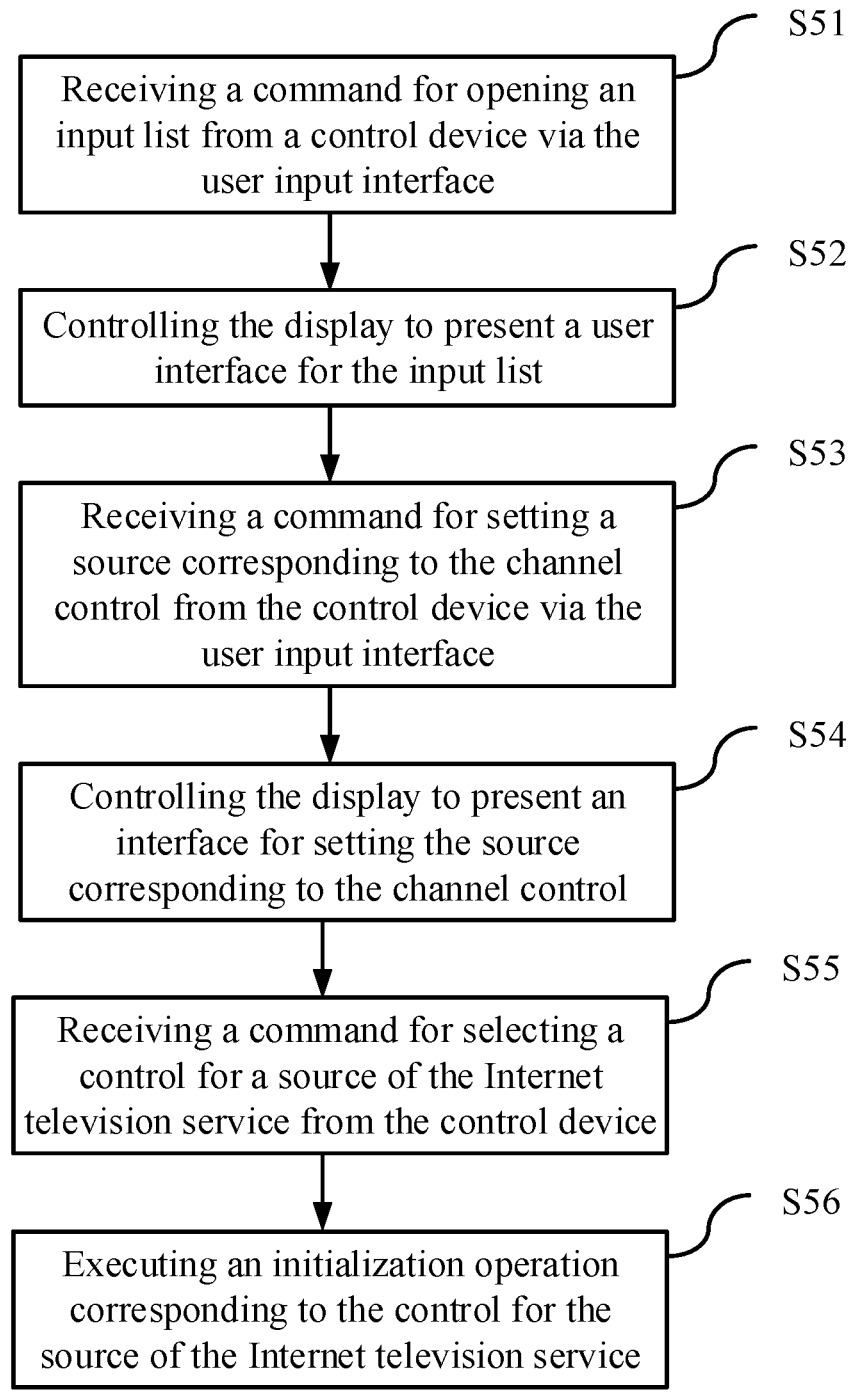
FIG. 19 shows a flowchart of a source switching method according to some embodiments.

In view of the above issues, embodiments of the present disclosure provide a source switching method. With reference to FIG. 19, the method includes the following steps.

Step S51: receiving a command for opening an input list from a control device via the user input interface.

Figure 20:
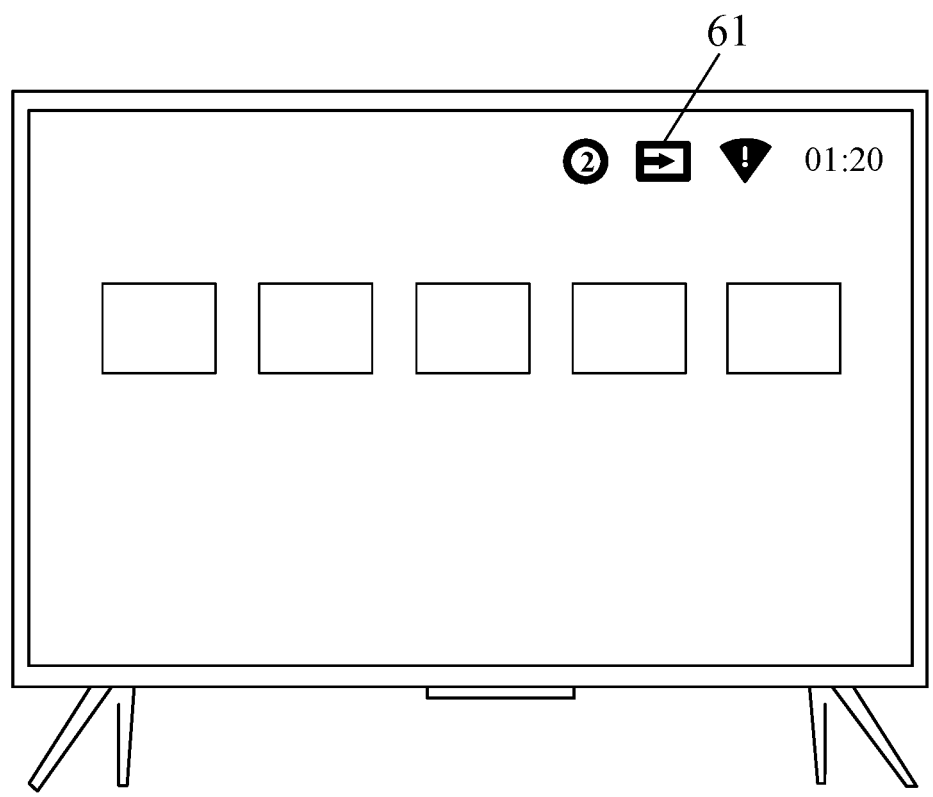
FIG. 20 shows a schematic diagram of a user interface according to some embodiments.

In some embodiments, as shown in FIG. 20, the command for opening the input list can be input by a selection on the input list control 61.

Figure 21:
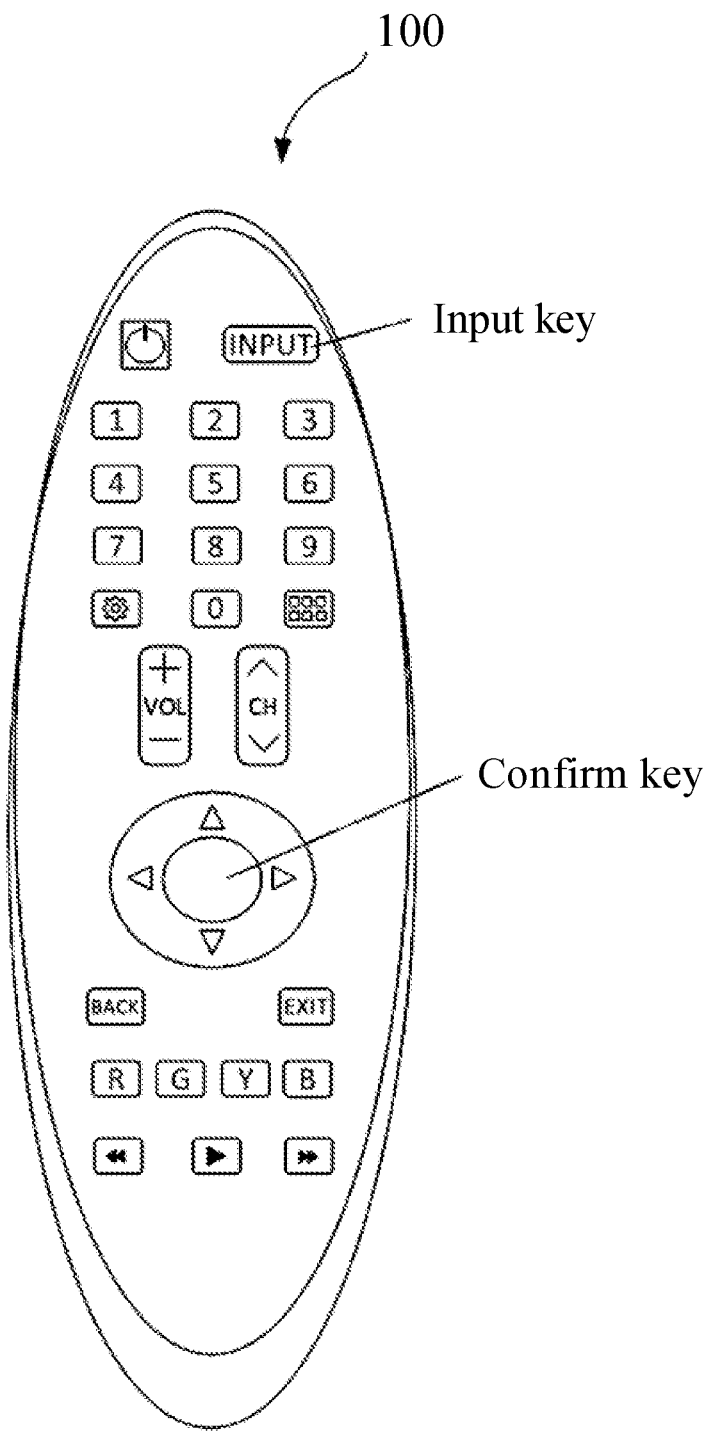
FIG. 21 shows a schematic diagram of a control device 100 according to some embodiments.

In some embodiments, the command for opening the input list can be input by pressing an input key on the control device as shown in FIG. 21.

Step S52: controlling the display to present a user interface for the input list, where the user interface includes a channel control.

The input list of the display apparatus may quickly show all the sources connected with the display apparatus. The input list menu is a very important entry for the user to switch the physical input or virtual input in the development of the display apparatus.

Figure 22:
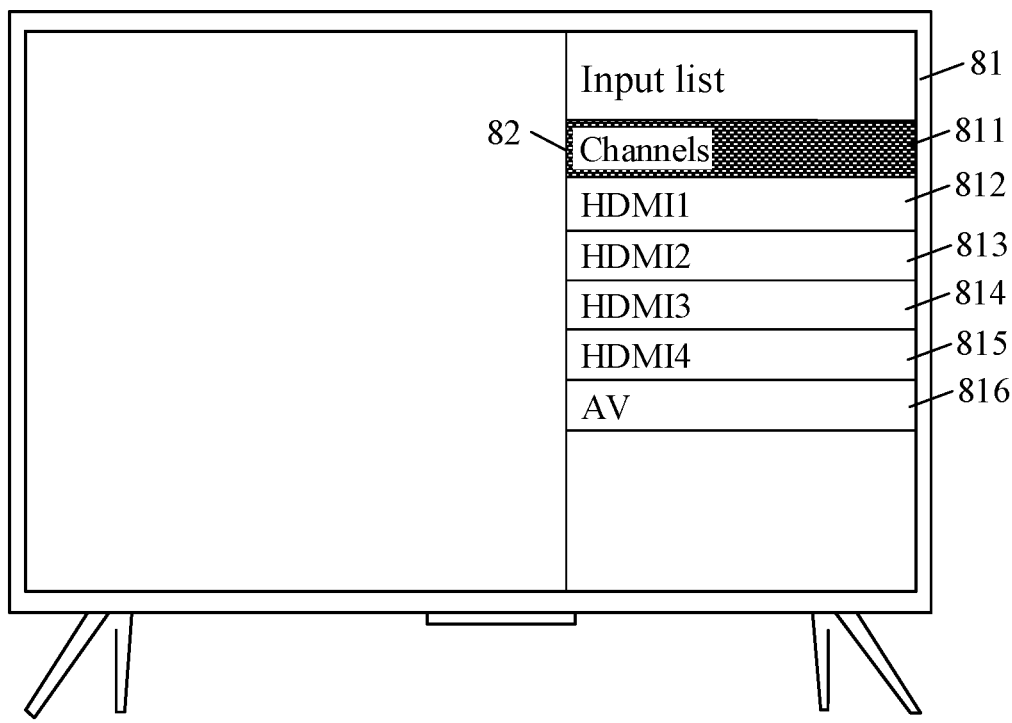
FIGS. 22-24 show schematic diagrams of user interfaces according to some embodiments.

In some embodiments, as shown in FIG. 22, the display apparatus may provide a user interface for the input list, and the user interface includes a presentation area 81 for presenting the input list. The presentation area 81 includes controls 811-816 provided for the user, and the controls 811-816 are for channels, HDMI1, HDMI2, HDMI3, HDMI4 and AV, respectively. The user interface also includes a selector 82 for indicating that any one of controls is selected. The selector 82 indicates that the control for Channels is selected in this case.

It should be noted that the controls refer to visual objects displayed in each presentation area of the user interface in the display apparatus 200 to represent corresponding content such as an icon, a thumbnail, a video clip, a link and the like.

It should also be noted that the selector indicates that one of the controls has been selected, such as a focus object. The selector can indicate a selection in various forms. For example, a position of the focus object can be indicated or identified by enlarging the control, a position of the focus object can be indicated or identified by setting a background color of the control, or a position of the focus object can be indicated by changing the border line, size, color, transparency and outline of the text or image, and/or font and the like of the control with the focus.

Step S53: receiving a command for setting a source corresponding to the channel control from the control device via the user input interface.

In some embodiments, the user can select the control for Channels as shown in FIG. 22 and then long press the confirm key on the control device as shown in FIG. 21 to input the command for setting the channel controls. Long-pressing indicates that the time of pressing the confirm key exceeds a preset threshold.

Step S54: controlling the display to present an interface for setting the source corresponding to the channel control, where the interface for setting the source corresponding to the channel control includes the control for the physical signal source and at least one control for a source of Internet television service.

In some embodiments, the interface for setting the source corresponding to the channel control includes all sources of the Tuner (broadcast) type in the system, and the sources of the Tuner type include physical signal sources (such as a digital television (DTV), and ATV), and a third-party OTT source. OTT source provides various video and data services based on the open Internet by Internet companies without relying on operators.

Figure 23:
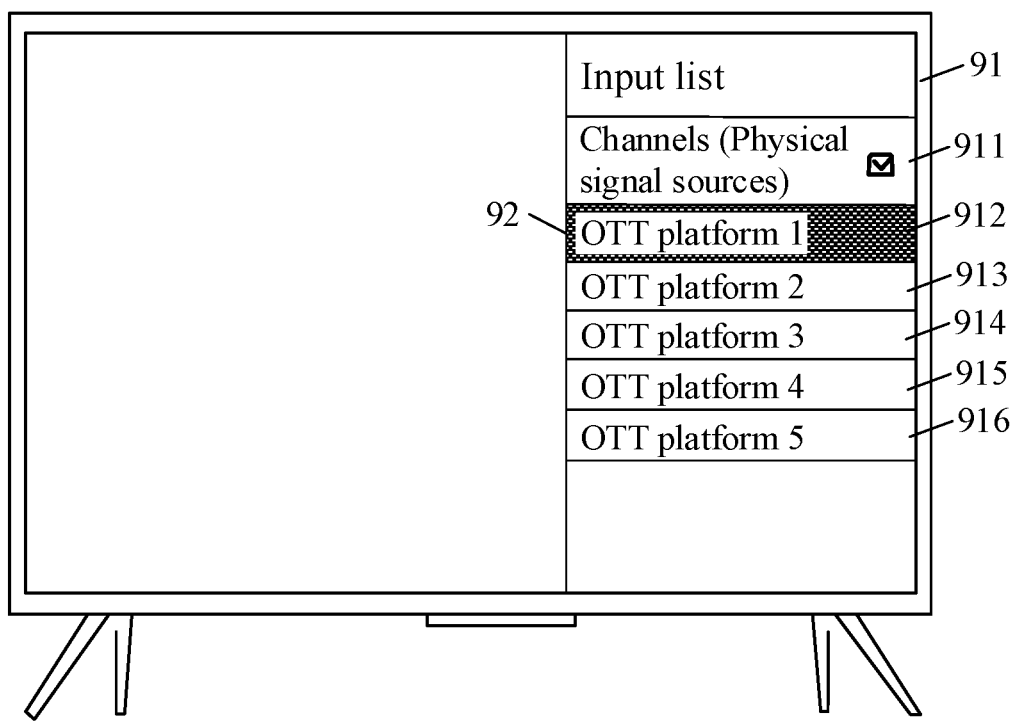

In some embodiments, as shown in FIG. 23, the display apparatus may provide the display with a user interface for setting a source corresponding to a channel control, and the user interface includes a presentation area 91 for presenting an input list. The presentation area 91 includes controls 911-916 provided for the user, and the controls 911-916 are for channels (physical signal sources), OTT platform 1, OTT platform 2, OTT platform 3, OTT platform 4 and OTT platform 5, respectively. The user interface also includes a selector 92 indicating that any one of the controls is selected. The selector 92 indicates that the control for OTT platform 1 is selected in this case.

Step S55: receiving a command for selecting a control for a source of the Internet television service from the control device.

In some embodiments, the user may select OTT platform 1 as shown in FIG. 23 and then press the confirm key on the control device as shown in FIG. 21 to input the command for selecting the control for the source of Internet television service.

Step S56: executing an initialization operation corresponding to the control for the source of the Internet television service.

In some embodiments, the step of executing the initialization operation corresponding to the control for the source of the Internet television service specifically includes: obtaining an initialization intent corresponding to the control for the source of the Internet television service; if the initialization intent is not empty, initializing the channel information in the source of Internet television service; and adding the channel information to the database.

In some embodiments, after the user selects the source of the Internet television service, the setup intent (initialization intent) in the control for the source of Internet television service is automatically obtained. If the setup intent corresponding to the source of Internet television service is not empty, the channel information in the source of Internet television service is initialized, and the obtained channel information is added to the tv.db database, so that when the user selects the channel control, the program from the source of the Internet television service can be played directly, and the program list in source of the Internet television service can be displayed.

Figure 24:
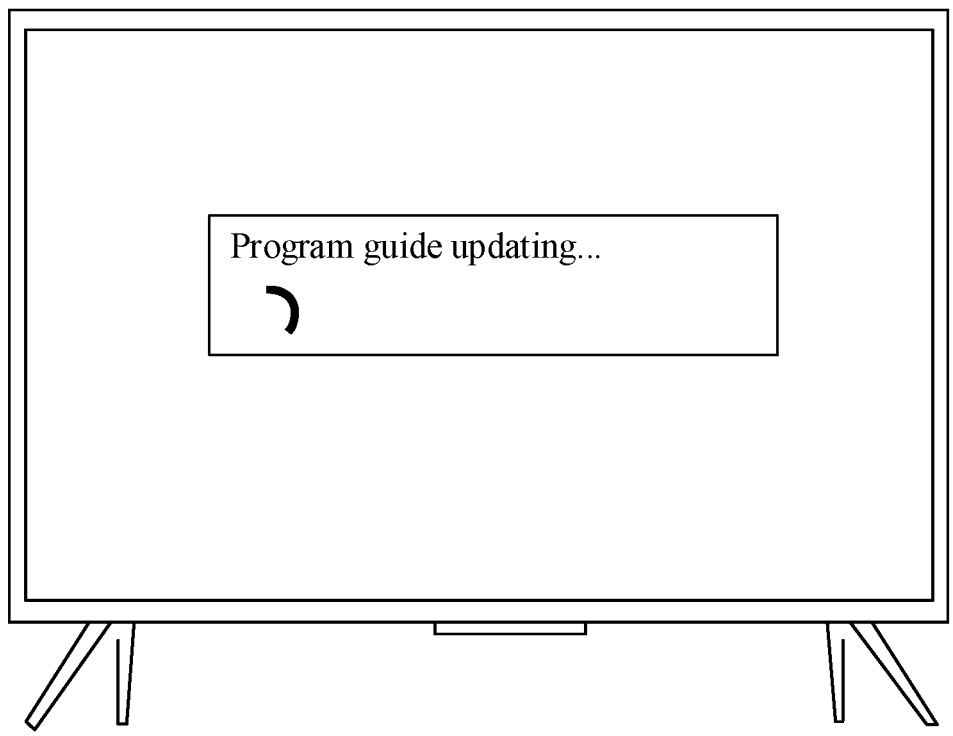

In some embodiments, in the process of executing the initialization operation corresponding to the control for the source of the Internet television service, the display is controlled to present the user interface as shown in FIG. 24. After executing the initialization operation corresponding to the control for the source of the Internet television service, the display is controlled to present the user interface shown in FIG. 22.

In some embodiments, after step S54, the user may select a physical signal source as the source corresponding to the channel control, and it may directly return to the user interface as shown in FIG. 22 after the user selects the physical source.

In the related art, when some applications that can play TV programs are shown in the channel list, the channel list includes all channels, including DTV and ATV sources, and third-party OTT sources, resulting in too many contents in the channel list, so that the time for finding a favorite channel is relatively long, and the user experience is poor.

Figure 25:
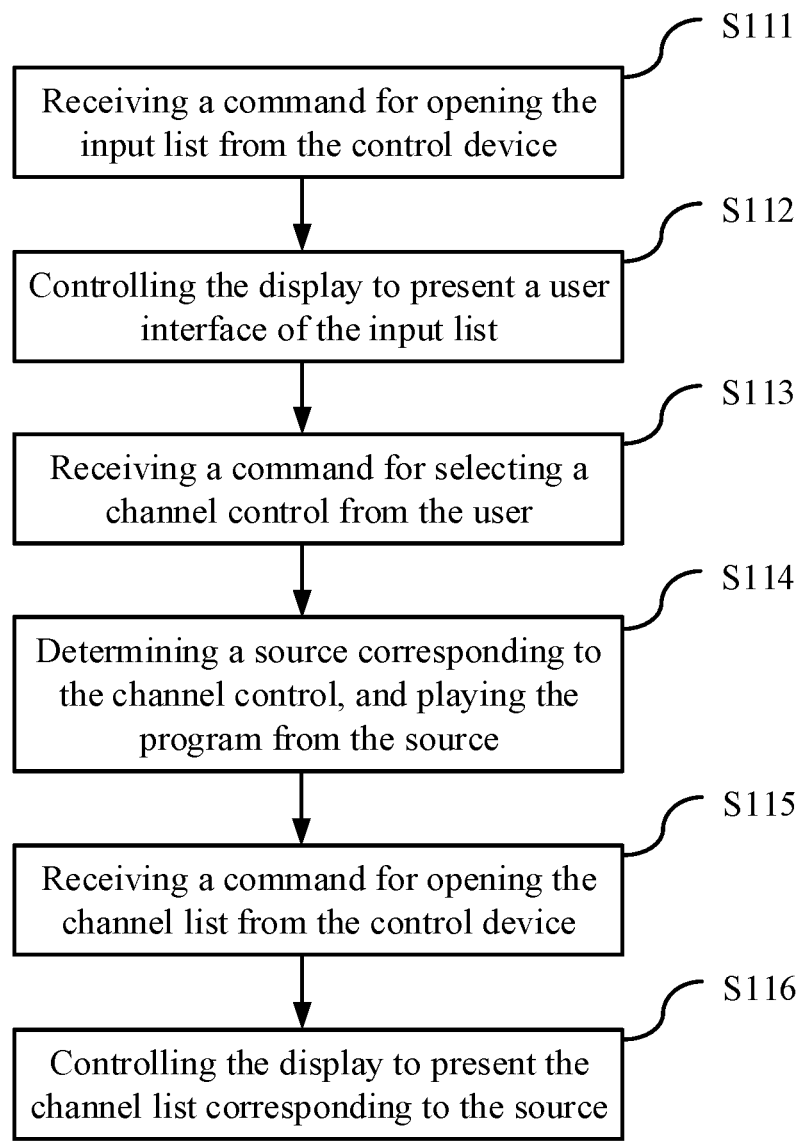
FIG. 25 shows a flowchart of a source program playing method according to some embodiments.

In view of the above issues, embodiments of the present disclosure provide a source program playing method. With reference to FIG. 25, the method includes the following.

Step S111: receiving, via the user input interface, a command for opening the input list from the control device.

Step S112: controlling the display to present a user interface of the input list, where the user interface includes channel controls.

Step S113: receiving, via the user input interface, a command for selecting a channel control from the control device.

In some embodiments, the user can select the control for Channels as shown in FIG. 22 and then short press the confirm key on the control device as shown in FIG. 21 to input the command for selecting the channel control. Short-pressing indicated that the time of pressing the confirm key does not exceed a preset threshold.

Step S114: determining the source corresponding to the channel control, and playing the program from the source.

In some embodiments, the source corresponding to the channel control includes a physical signal source or a source of an Internet television service; and the source corresponding to the channel control is preset by the user, and its setting method is as shown in FIG. 19.

Figure 26:
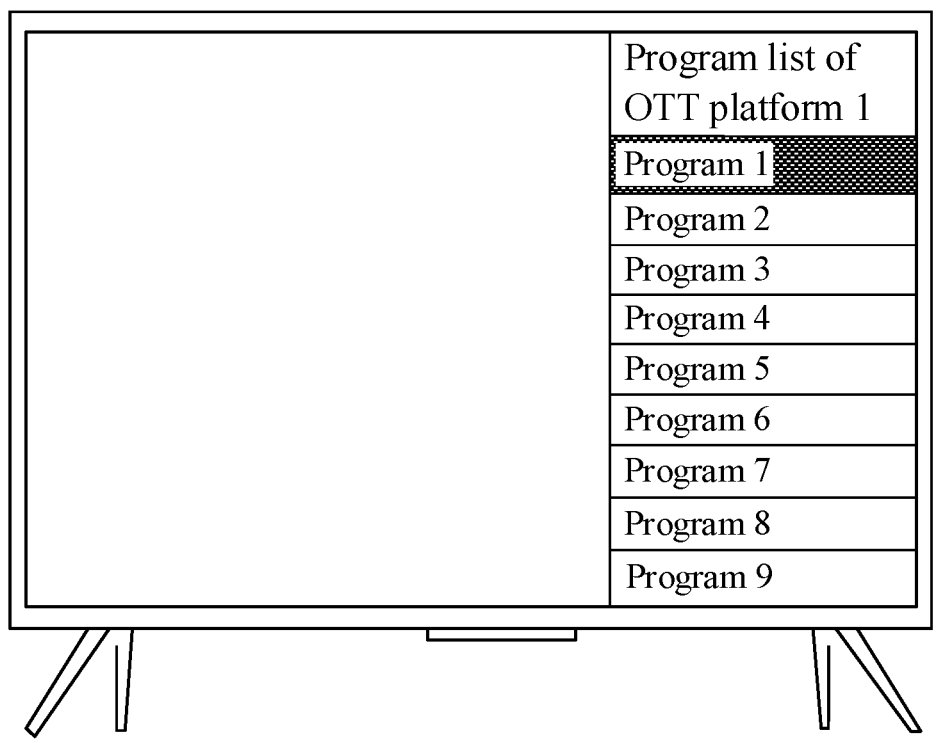
FIG. 26 shows a schematic diagram of another user interface according to some embodiments.

In some embodiments, if it is determined that the source corresponding to the channel control is OTT platform 1, the program corresponding to OTT platform 1 is played, as shown in FIG. 26. If the physical source corresponding to the channel control is determined, the program from the physical signal source is played.

In some embodiments, when the user selects the channel control, a LiveTV (a live broadcast application) will be started, and then the program corresponding to the source preset by the user will be played.

Step S115: receiving, via the user input interface, a command for opening the channel list from the control device.

In some embodiments, the user presses the confirm key on the control device as shown in FIG. 21 to input the command for opening the channel list in FIG. 26.

Step S116: controlling the display to display the channel list corresponding to the source.

When the user sets the source corresponding to the channel control, the user has added the channel information of the selected source of the Internet television service to the tv.db database, and the channel list of the selected source of the Internet television service can be directly displayed.

In the above embodiments, the input list is customized, the sources corresponding to the channel controls in the input list are expanded to realize one-key switching of sources of Internet television service and quick modification of the source of Internet television service, and solve the cumbersome problem of initializing the source of Internet television service in the related art, so as to improve the convenience of user operations and improve user experience.

For the convenience of explanation, the above illustration is performed in combination with specific embodiments. However, the above exemplary discussion is not intended to be exhaustive or to limit the embodiments to the specific forms disclosed above. Based on the above teachings, various modifications and transformations can be obtained. The selection and description of the above embodiments are to better explain the principles and practical applications, so as to enable those skilled in the art to better use the embodiments and various variant embodiments suitable for specific use considerations.

What is claimed is:

1. A display apparatus, comprising:
   a display configured to display an image from broadcast system or Internet, and/or, a user interface;
   a memory configured to store instructions and data associated with the display;
   a control device comprising at least one key; and
   at least one processor in connection with the display and the memory, and configured to execute the instructions to cause the display apparatus to:
   in response to a boot command for starting the display apparatus from a user, enter a preset application in the display apparatus, wherein a user interface of the preset application is a black screen;
   detect whether a smart boot mode configured in the display apparatus is in an on state;
   in response to the smart boot mode being in the on state, read an attribute value stored in a database of the display apparatus, wherein the attribute value is set via a setting menu or a physical signal source setting menu;
   in response to the attribute value being a first preset value, cause the display to present a startup homepage, and exit from the preset application;
   in response to the attribute value being a second preset value different from the first preset value, read an input ID configured in the display apparatus, control the display to present an interface of a physical signal source corresponding to the input ID, and exit from the preset application;
   in response to the attribute value being a third preset value different from the first and second preset value, read a package name, and control the display to display an application interface corresponding to the package name, and exit from the preset application; and
   in response to the smart boot mode being in an off state, control the display to present the startup homepage, and exit from the preset application.

2. The display apparatus according to claim 1, wherein the at least one processor is further configured to execute the instructions to cause the display apparatus to:
   detect whether the smart boot mode is in the on state by detecting whether a boot switch value is a fourth preset value.

3. The display apparatus according to claim 1, wherein the smart boot mode is set via the setting menu.

4. The display apparatus according to claim 1, wherein the smart boot mode is set via the physical signal source setting menu.

5. The display apparatus according to claim 1, wherein the at least one processor is further configured to execute the instructions to cause the display apparatus to:
   receive a command for opening an input list from the user, cause the display to present a user interface for the input list, wherein the user interface for the input list comprises a channel control, and the input list is configured to show sources in connection with the display apparatus, the input list comprises one or more input ID;
   in response to a selection on the channel control, receive a command input from the user implemented by pressing a first preset key on the control device;
   in response to a time of pressing the first preset key exceeding a preset threshold, control the display to present an interface for setting a source corresponding to the channel control.

6. The display apparatus according to claim 5, wherein the interface for setting the source corresponding to the channel control comprises a control for a physical signal source and at least one control for a source of Internet television service.

7. The display apparatus according to claim 6, wherein the physical signal source comprises one or more of: a digital television (DTV), an analog television (ATV), or at least one high-definition multimedia interface (HDMI).

8. The display apparatus according to claim 6, wherein the at least one processor is further configured to execute the instructions to cause the display apparatus to:
   receive a command for selecting a first control for a first source of the Internet television service from the user, execute an initialization operation corresponding to the first control;
   wherein the initialization operation comprises: obtaining an initialization intent corresponding to the first control; in response to the initialization intent being not empty, initializing channel information in the first source of Internet television service, and adding the channel information to the database in such a way that channel information corresponding to the channel control is the channel information in the first source of Internet television service.

9. The display apparatus according to claim 6, wherein the at least one processor is further configured to execute the instructions to cause the display apparatus to:

in response to the time of pressing the first preset key not exceeding the preset threshold, cause the display to present a channel list from a second source of the Internet television service and play a program from the second source.

10. A method for a display apparatus, comprising:

in response to a boot command for starting the display apparatus from a user, entering a preset application in the display apparatus, wherein a user interface of the preset application is a black screen; wherein the display apparatus comprises a display configured to display an image from broadcast system or Internet, and/or, a user interface, and a control device comprising at least one key;

detecting whether a smart boot mode configured in the display apparatus is in an on state;

in response to the smart boot mode being in the on state, reading an attribute value stored in a database of the display apparatus, wherein the attribute value is set via a setting menu or a physical signal source setting menu;

in response to the attribute value being a first preset value, causing the display to present a startup homepage, and exiting from the preset application;

in response to the attribute value being a second preset value different from the first preset value, reading an input ID configured in the display apparatus, controlling the display to present an interface of a physical signal source corresponding to the input ID, and exiting from the preset application;

in response to the attribute value being a third preset value different from the first and second preset value, reading a package name, and controlling the display to display an application interface corresponding to the package name, and exiting from the preset application; and in response to the smart boot mode being in an off state, controlling the display to present the startup homepage, and exiting from the preset application.

11. The method according to claim 10, further comprising:

detecting whether the smart boot mode is in the on state by detecting whether a boot switch value is a fourth preset value.

12. The method according to claim 10, wherein the smart boot mode is set via the setting menu.

13. The method according to claim 10, wherein the smart boot mode is set via the physical signal source setting menu.

14. The method according to claim 10, further comprising:

receiving a command for opening an input list from the user, controlling the display to present a user interface for the input list, wherein the user interface for the input list comprises a channel control, and the input list is configured to show sources in connection with the display apparatus and comprises one or more input ID;

in response to a selection on the channel control, receiving a command input from the user implemented by pressing a first preset key on the control device;

in response to a time of pressing the first preset key exceeding a preset threshold, controlling the display to present an interface for setting a source corresponding to the channel control.

15. The method according to claim 14, wherein the interface for setting the source corresponding to the channel control comprises a control for a physical signal source and at least one control for a source of Internet television service.

16. The method according to claim 15, wherein the physical signal source comprises one or more of: a digital television (DTV), an analog television (ATV), or at least one high-definition multimedia interface (HDMI).

17. The method according to claim 15, further comprising:

receiving a command for selecting a first control for a first source of the Internet television service from the user, executing an initialization operation corresponding to the first control;

wherein the initialization operation comprises: obtaining an initialization intent corresponding to the first control; in response to the initialization intent being not empty, initializing channel information in the first source of Internet television service, and adding the channel information to the database in such a way that channel information corresponding to the channel control is the channel information in the first source of Internet television service.

18. The method according to claim 15, further comprising:

in response to the time of pressing the first preset key not exceeding the preset threshold, controlling the display to present a channel list corresponding to a second source of the Internet television service and play a program from the second source.

* * * * *